US009883066B2

(12) United States Patent
Shin et al.

(10) Patent No.: US 9,883,066 B2
(45) Date of Patent: Jan. 30, 2018

(54) METHOD AND DEVICE FOR PERFORMING PRINTING OPERATION THROUGH COMMUNICATION SERVICE OF IMAGE FORMING APPARATUS

(71) Applicant: S-PRINTING SOLUTION CO., LTD., Suwon-si, Gyeonggi-do (KR)

(72) Inventors: Jung-hyun Shin, Suwon-si (KR); Jeong-phil Kim, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/179,226

(22) Filed: Jun. 10, 2016

(65) Prior Publication Data

US 2017/0013153 A1    Jan. 12, 2017

(30) Foreign Application Priority Data

Jul. 10, 2015    (KR) ........................ 10-2015-0098413

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |
| H04W 4/00 | (2009.01) | |
| H04W 52/02 | (2009.01) | |
| H04W 76/02 | (2009.01) | |

(52) U.S. Cl.
CPC ........... *H04N 1/00891* (2013.01); *G06F 3/12* (2013.01); *H04N 1/00* (2013.01); *H04N 1/00896* (2013.01); *H04W 4/008* (2013.01); *H04W 52/0238* (2013.01); *H04W 52/0245* (2013.01); *H04W 76/02* (2013.01); *Y02B 60/50* (2013.01)

(58) Field of Classification Search
CPC .. H04N 1/00891; H04N 1/00; H04N 1/00896; G06F 3/12; H04W 4/008; H04W 52/0238; H04W 52/0245
USPC .............................. 358/1.13, 1.14, 1.15, 1.1
See application file for complete search history.

(56) References Cited

U.S. PATENT DOCUMENTS

| | | | |
|---|---|---|---|
| 6,492,957 B2 | 12/2002 | Carillo, Jr. et al. | |
| 2014/0194062 A1 | 7/2014 | Palin et al. | |
| 2016/0255218 A1* | 9/2016 | Takahashi | H04N 1/00323 358/1.15 |
| 2016/0301434 A1* | 10/2016 | Botchway | H04W 52/24 |

FOREIGN PATENT DOCUMENTS

| | | |
|---|---|---|
| EP | 1 612 999 A1 | 1/2006 |
| EP | 2 858 391 A1 | 4/2015 |
| EP | 2 892 259 A1 | 7/2015 |

OTHER PUBLICATIONS

Extended European Search Report dated Nov. 28, 2016 in corresponding European Patent Application No. 16171782.2.

* cited by examiner

*Primary Examiner* — Douglas Tran

(74) *Attorney, Agent, or Firm* — Staas & Halsey LLP

(57) ABSTRACT

An image forming apparatus and a communication connection method thereof. The communication connection method includes: receiving, by a first image forming apparatus, packet information from a second image forming apparatus; measuring, by the first image forming apparatus, a signal strength of the received packet information; and changing a connection reference strength of the first image forming apparatus based on the measured signal strength.

20 Claims, 21 Drawing Sheets

FIG. 14

| DISTANCE (m) | STRENGTH (dBm) |
|---|---|
| 10 m | 5 dBm |
| 8 m | 7 dBm |
| 6 m | 9 dBm |
| 4 m | 13 dBm |
| 2 m | 15 dBm |

METHOD AND DEVICE FOR PERFORMING PRINTING OPERATION THROUGH COMMUNICATION SERVICE OF IMAGE FORMING APPARATUS

CROSS-REFERENCE TO RELATED APPLICATIONS

This application claims the priority benefit of Korean Patent Application No. 10-2015-0098413, filed on Jul. 10, 2015, in the Korean Intellectual Property Office, the disclosure of which is incorporated herein in its entirety by reference.

BACKGROUND

1. Field

The present disclosure relates to methods and devices for performing a printing operation through a communication service of an image forming apparatus. More specifically, the present disclosure relates to methods and devices for sensing and reducing an interference signal generated between image forming apparatuses supporting a communication service such as a Bluetooth communication service and for reducing power consumed in communication such as Bluetooth Low Energy (BLE) in Bluetooth communication service.

2. Description of the Related Art

Bluetooth technology may be used as a substitute for a wired connection such as a cable connection usually necessary between two devices, and is implemented as a single wireless connection within a short range. For example, when Bluetooth wireless technology is implemented on a mobile phone and a laptop computer, the mobile phone and the laptop computer may be connected together without any cable. Any digital devices, including a printer, a personal digital assistant (PDA), a desktop computer, a fax, a keyboard, and a joystick, may become a part of a Bluetooth system. The Bluetooth wireless technology enables devices to operate free of cables and may serve as an interface between an existing data network and neighboring devices and as a universal bridge to form a special group between devices located far away from a stationary network infrastructure. The Bluetooth strengthens connection between devices by using rapid recognition and frequency hopping. A Bluetooth module avoids interference between different signals by performing new frequency hopping after broadcasting a packet. As compared with other systems operating at the same frequency, the Bluetooth uses fast and short packets. Bluetooth 4.0 including Classic Bluetooth (CB), Bluetooth High Speed (BHS), and Bluetooth Low Energy (BLE) protocols was announced, and BLE technology has attracted much attention.

Various wireless communication technologies are used for mutual connection between an image forming apparatus and a device. However, in a case where a user connects a device to an image forming apparatus, it is inconvenient for the user to manually select one of image forming apparatuses searched for by the device.

On the other hand, the device may be automatically connected to the image forming apparatus when a signal strength of a packet received from the image forming apparatus is measured and the measured signal strength is sufficiently strong to connect to the image forming apparatus. However, in a case where a plurality of image forming apparatuses each having a Bluetooth communication function are located adjacent to one another, the device may receive a packet having a sufficient signal strength from an unintended image forming apparatus. In this case, the device may be connected to the unintended image forming apparatus. Hence, even when the user is located far away from the image forming apparatus so that the user cannot manipulate the image forming apparatus, the device may be automatically connected to the image forming apparatus.

Therefore, there is a need to connect a device to an image forming apparatus only when a user of a device approaches a desired image forming apparatus.

SUMMARY

In some embodiments, strengths of received signals broadcast by neighboring image forming apparatuses may be measured and a connection reference strength of an imaging forming apparatus may be changed based on the measured strengths of the received signals, so that the image forming apparatus performing a communication reduces a signal interference with neighboring image forming apparatuses.

In addition, in some embodiments, when the image forming apparatus discovers a device, a broadcasting period of a packet transmitted for discovering the device may be changed and the image forming apparatus changes between a sleep mode and an awake mode, thus reducing power consumption of the image forming apparatus.

Additional aspects will be set forth in part in the description which follows and, in part, will be apparent from the description, or may be learned by practice of the presented embodiments.

According to an aspect of an embodiment, a communication connection method includes: receiving, by a first image forming apparatus, packet information from a second image forming apparatus; measuring, by the first image forming apparatus, a signal strength of the received packet information; and changing a connection reference strength of the first image forming apparatus based on the measured signal strength.

The communication connection method may further include broadcasting, by the first image forming apparatus, a packet to one or more devices.

The broadcasting of the packet further may include increasing a packet broadcasting time interval when the first image forming apparatus does not receive a connection request message for a first predetermined time.

The communication connection method may further include scanning a device so as to discover the device, when the first image forming apparatus does not receive the connection request message for a second predetermined time.

The communication connection method may further include changing the first image forming apparatus from an awake mode to a sleep mode when the first image forming apparatus does not receive the connection request message for a second predetermined time.

The communication connection method may further include, when the first image forming apparatus is changed to the sleep mode, changing the first image forming apparatus to the awake mode by an input of a user of the first image forming apparatus.

The connection reference strength may be a reference strength for setting a device, which transmits a connection request message received with a predetermined signal strength or more, as a connection target based on a signal strength of a connection request message to be received from one or more devices by the first image forming apparatus.

The connection reference strength of the first image forming apparatus after the changing may be greater than the connection reference strength of the first image forming apparatus before the changing.

The communication connection method may further include receiving a connection request message from the one or more devices in response to the packet broadcast by the first image forming apparatus.

The communication connection method may further include connecting a session to the one or more devices based on the received connection request message.

The communication connection method may use a Bluetooth Low Energy (BLE) communication method.

According to an aspect of another embodiment, a first image forming apparatus may include: a communicator configured to receive packet information from a second image forming apparatus; a storage configured to store the received packet information; and a controller configured to measure a signal strength of the received packet information and change a connection reference strength based on the measured signal strength.

The communicator may be further configured to broadcast a packet to one or more devices.

The controller may be further configured to increase a packet broadcasting time interval when the communicator does not receive a connection request message for a first predetermined time.

The controller may be set to scan a device so as to discover the device, when the communicator does not receive the connection request message for a second predetermined time.

The controller may be further configured to change the communicator from an awake mode to a sleep mode when the communicator does not receive the connection request message for a second predetermined time.

When the communicator is changed to a sleep mode, the controller may be set to change the communicator to an awake mode by an input of a user of the first image forming apparatus.

The connection reference strength may be a reference strength for setting a device, which transmits a connection request message received with a predetermined signal strength or more, as a connection target based on a signal strength of a connection request message to be received by the first image forming apparatus.

The connection reference strength of the first image forming apparatus after the change may be greater than the connection reference strength of the first image forming apparatus before the change.

The communicator may be further configured to receive a connection request message from the one or more devices in response to the broadcast packet.

The controller may be set to connect a session to the one or more devices based on the received connection request message.

The communicator may be further configured to use a Bluetooth Low Energy (BLE) communication method.

BRIEF DESCRIPTION OF THE DRAWINGS

These and/or other aspects will become apparent and more readily appreciated from the following description of embodiments, taken in conjunction with the accompanying drawings in which:

FIG. 14 is a table showing a received signal strength with respect to a distance of an image forming apparatus, according to an embodiment;

DETAILED DESCRIPTION

Figure 1:
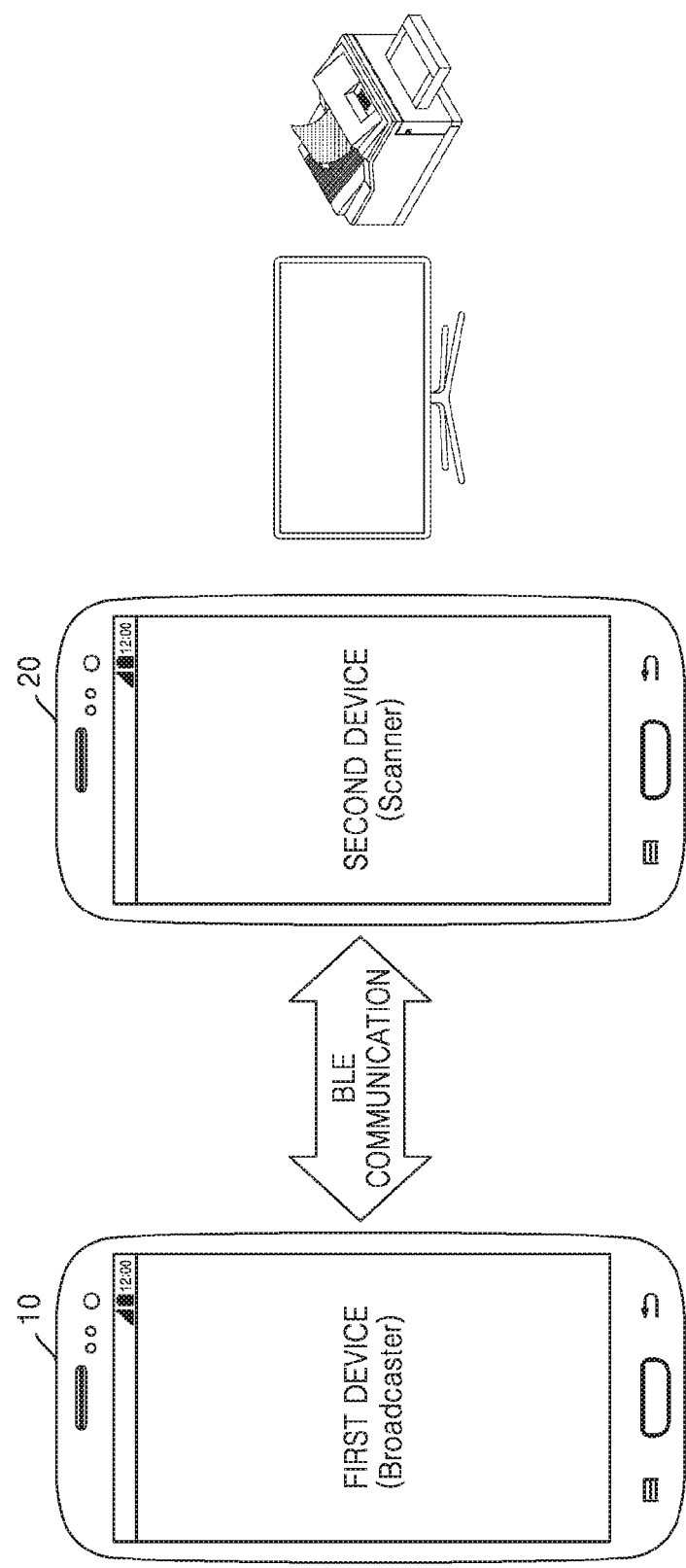
FIG. 1 is a diagram for describing a communication system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure will be described briefly and embodiments will be then described in detail.

The terms used in this specification are those general terms currently widely used in the art in consideration of functions in regard to the inventive concept, but the terms may vary according to the intention of those of ordinary skill in the art, precedents, or new technology in the art. In addition, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The term "Bluetooth Low Energy (BLE)" used herein is one of short-range communication technologies and means an essential function of Bluetooth V4.0. The BLE has a relatively small duty cycle, as compared with the classic Bluetooth standard. The BLE enables low-cost production and reduces average power and standby power. Therefore, the BLE may be operable for several years by using a coin-sized battery.

The embodiments will be described with reference to the accompanying drawings in such a manner that the embodiments may be easily carried out by a person of ordinary skill in the art. However, the inventive concept may be implemented in various forms and is not limited to the embodiments. In addition, descriptions of well-known functions and constructions will be omitted for clarity and conciseness, and similar reference numerals are assigned to similar elements throughout the present disclosure.

It will be understood that when a region is referred to as being "connected to" or "coupled to" another region, it may be directly connected or coupled to the other region or intervening regions may be present.

The term "device" used herein may be used interchangeably with "equipment" or "apparatus", and the terms "device", "equipment", and "apparatus" may be described by the same expression.

The term "device information" used herein means information indicating a device and an attribute of the device. For example, the device information may include information about an identification value of the device, a type of the device, a type and an attribute of sensing data sensed by the device, and a sensing period of the device.

In addition, "service" used herein may include various services that are executable in the device. The service may include a service based on a communication with a server or other devices, and a service operable in the device. It will be understood that the service applicable in the present disclosure is a broad concept encompassing various services executable in the device, as well as the service disclosed herein as an example.

The technology disclosed herein is applicable to any fields in which device to device (D2D) communication is available. Examples of the D2D communication may include Internet of Things (IoT), a ubiquitous service, a smart home service, and a connected car service.

Hereinafter, embodiments will be described in detail with reference to the accompanying drawings.

FIG. 1 is a diagram for describing a communication system according to an embodiment.

As illustrated in FIG. 1, the communication system according to the present embodiment may include a first device 10 and a second device 20. The first device 10 may be a device that broadcasts a packet, and the second device 20 may be a device that discovers and scans the first device 10 and receive the packet broadcast by the first device 10. The first device 10 and the second device 20 will be described below in detail.

According to an embodiment, the first device 10 may include a Bluetooth Low Energy (BLE) communicator configured to broadcast a packet. According to an embodiment, the first device 10 may broadcast an advertising packet based on a BLE standard. For convenience of description, the advertising packet based on the BLE standard will be referred to as a "BLE packet" or a "packet".

According to an embodiment, the first device 10 may write filtering information to a header of a BLE packet. The filtering information may mean information for changing an application processor (AP) from a sleep mode to an awake mode in the second device 20 that receives the BLE packet. For example, service identification information (e.g., service ID), company identification information (e.g., company ID), and the like of the first device 10 may be used as the filtering information, but the filtering information is not limited thereto.

According to an embodiment, in order to overcome length limitation of the BLE packet, the first device 10 may write one piece of data into a plurality of BLE packets and broadcast the plurality of BLE packets. In this case, the first device 10 may write information about a total number of packets (e.g., final number (FN)) and identification information of a current packet (e.g., current number (CN)) to the BLE packets.

The first device 10 according to the present embodiment may be implemented in various forms. The first device 10 may be, for example, a mobile phone, a smart phone, an image forming apparatus, a notebook computer (laptop computer), a tablet personal computer (PC), an e-book terminal, a digital broadcasting terminal, a personal digital assistant (PDA), a personal multimedia player (PMP), a navigation system, an MP3 player, a digital camera, a wearable device (e.g., glasses, a wristwatch, etc.), but is not limited thereto.

The second device 20 may include a BLE communicator configured to receive the BLE packet broadcast by the first device 10. The second device 20 may set the operating mode of the AP to the sleep mode or the awake mode. In the sleep mode, the AP may be in an inactive state. Accordingly, when the AP is in the sleep mode, the second device 20 may reduce power consumption of the AP. When the operating mode of the AP is changed from the sleep mode to the awake mode, the AP may become an active state.

The second device 20 may change the AP from the sleep mode to the awake mode based on filtering information (e.g., service identification information, company identification information, final number, current number) included in a header of the BLE packet broadcast by the first device 10 or filtering information (e.g., final number, current number, etc.) included in a payload of the BLE packet. In addition, the second device 20 may maintain the operating mode of the AP in the sleep mode based on the filtering information included in the header of the BLE packet broadcast by the first device 10 or the filtering information included in the payload of the BLE packet.

The second device 20 according to the present embodiment may be implemented in various forms. The second device 20 may be a display device having a screen, or may be an accessory device having no screen. The second device 20 may be, for example, a mobile phone, a smart phone, an image forming apparatus, a notebook computer (laptop computer), a tablet PC, an e-book terminal, a digital broadcasting terminal, a PDA, a PMP, an audio device, a display device, a navigation system, an MP3 player, a digital camera, a smart TV, a wireless speaker, a Bluetooth headset, glasses, a wristwatch, a home sink, and a refrigerator, an air conditioner, and a water purifier, each of which has a communication function, but is not limited thereto.

Figure 2:
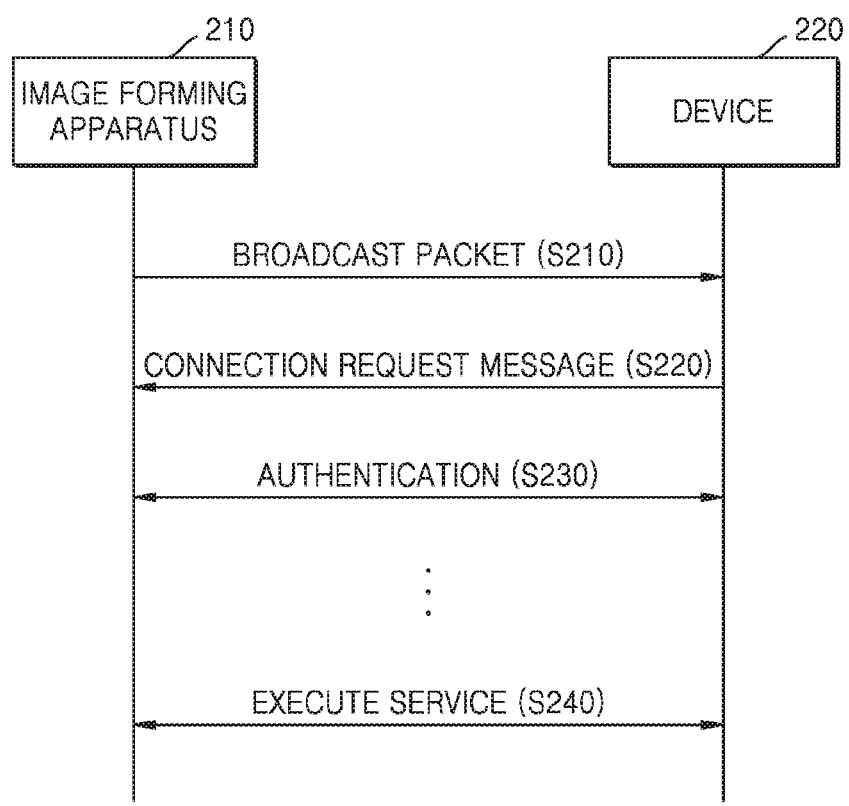
FIG. 2 is a flowchart of a process of Bluetooth Low Energy (BLE) connection between an image forming apparatus and a device, according to an embodiment.

FIG. 2 is a flowchart of a process of BLE connection between an image forming apparatus 210 and a device 220, according to an embodiment.

As illustrated in FIG. 2, the BLE communication between devices may be BLE communication between the image forming apparatus 210 and the device 220. The image forming apparatus 210 also is one device and may perform the BLE connection to a device such as a smart phone.

In operation S210, the image forming apparatus 210 may broadcast a packet so as to discover and scan a device to communicate with. The device 220 may receive the packet broadcast by the image forming apparatus 210.

The image forming apparatus 210 may periodically broadcast an advertising packet indicating its own existence. In the case, the packet may include identification information (e.g., media access control (MAC) address) of the image forming apparatus 210. In addition, the packet may include a flag indicating a feature of the image forming apparatus 210. The flag indicating the feature of the image forming apparatus 210 indicates a state of a function to be provided via a wireless connection to a mobile terminal by the image forming apparatus 210. For example, the flag indicating the feature of the image forming apparatus 210 may include a flag indicating whether it is necessary to perform a user authentication for the image forming apparatus 210, whether a pull-printing is ready, or whether a scan is ready. In addition, the broadcast packet may include an IP address of the image forming apparatus 210, status information of the image forming apparatus 210 (e.g., an error occurring in the image forming apparatus 210), information about a toner of the image forming apparatus 210, a phone number of a mobile terminal to transmit image data generated by scanning a document. The broadcast packet may be a message based on the BLE standard.

The device 220 may receive packets periodically broadcast by the image forming apparatus 210. In this case, the device 220 receives not one packet but a plurality of packets for unit time. The device 220 may determine whether to transmit a connection request according to the number of packets received for unit time and the signal strength of the received packets. When the user is located within a region that is so close as to manipulate the image forming apparatus 210, the signal strength of the received packet is strong. Therefore, the device 220 may determine to transmit the connection request to the image forming apparatus 210.

In operation S220, the device 220 may transmit a connection request message to the image forming apparatus 210 so as to communicate with the image forming apparatus 210. For example, the device 220 may transmit the connection request message to the image forming apparatus 210 so as to print an image captured by the device 220. The image forming apparatus 210 may discover the device 220 by receiving the connection request message transmitted by the device 220.

In operation S230, since the image forming apparatus 210 and the device 220 have discovered each other, a process such as an authentication may be performed for session connection. The image forming apparatus 210 and the device 220 may increase the accuracy of the session connection by confirming the identification information or authentication related information of the user or the device 220.

When the image forming apparatus 210 is connected to the device 220 via a wireless communication, the image forming apparatus 210 may receive user information of the device 220 from the device 220 and perform a user authentication for the image forming apparatus 210 by using the received user information.

The user information is a type of identification information transmitted from the device 220 to the image forming apparatus 210 when the user authentication is required in the image forming apparatus 210 in order for the user to perform an operation by using the image forming apparatus 210. The user information may include identification information of the device 220, such as a serial number or a phone number of the device 220. In addition, the user information may include user identification information, such as user ID and password that are previously input to the device 220 by the user.

Specifically, the image forming apparatus 210 may have preregistered user information and compare the preregistered user information with user information of the device 220 received from the device 220 so as to determine whether the preregistered user information matches the received user information of the device 220. When it is determined that the preregistered user information matches the received user information of the device 220, the image forming apparatus 210 may determine that the user authentication for the image forming apparatus 210 is successful. When it is determined that the preregistered user information does not match the received user information of the device 220, the image forming apparatus 210 may determine that the user authentication for the image forming apparatus 210 is failed.

A domain of the authentication method for the image forming apparatus 210 is a local domain. The user authentication for the image forming apparatus 210 is performed by using the user information stored in the image forming apparatus 210, but is not limited thereto. An authentication domain may be a network domain. In this case, the image forming apparatus 210 may transmit the received user information to a device connected to a network, such as a server, instead of the user information stored in the image forming apparatus 210, and the server may perform user authentication for the image forming apparatus 210 by using the user information stored in the server. In this case, the server may transmit, to the image forming apparatus 210, a message containing a result of the user authentication for the image forming apparatus 210, and the image forming apparatus 210 may receive the message and determine that the user authentication for the image forming apparatus 210 is successfully performed.

In operation S240, the image forming apparatus 210 and the device 220, the sessions of which are connected, may execute a service. For example, the image forming apparatus 210 may output image information transmitted by the device 220. Alternatively, the image forming apparatus 210 may transmit a received file to the device 220.

When the user authentication for the image forming apparatus 210 is successful, the image forming apparatus 210 may perform an operation based on a user input. For example, when the user authentication for the image forming apparatus 210 is successful, the image forming apparatus 210 may provide a user interface (UI) capable of receiving the user input, and the user may perform the user input through the UI. In this case, the image forming apparatus 210 may perform various operations, such as printing, scanning, or fax, according to the user input.

In addition, when the user information is the phone number of the device 220, the image forming apparatus 210 may acquire the phone number of the device 220 from the device 220 and perform the user authentication for the image forming apparatus 210 based on the phone number of the device 220. When the user authentication is successful, the image forming apparatus 210 may provide the user with a UI capable of receiving a user input of transmitting image data to the device 220. When the image forming apparatus receives the user input of transmitting image data to the device 220 through the UI, the image forming apparatus 210 may generate image data by scanning a document and transmit the generated image data to the device 220.

According to an embodiment, when the user approaches the image forming apparatus 210 while carrying the device 220, the image forming apparatus 210 may perform the user authentication for the image forming apparatus 210. When the user authentication for the image forming apparatus 210 is successful, the image forming apparatus 210 unlocks a locked UI and displays the UI. The image forming apparatus 210 may receive the user input from the user through the unlocked UI and perform an operation, such as printing, scanning, or fax.

On the other hand, the image forming apparatus 210 may provide a UI indicating a reception of a user input of transmitting image data to the device 220. When the image forming apparatus receives the user input of transmitting image data to the device 220 through the UI, the image forming apparatus 210 may generate image data by scanning a document and transmit the generated image data to the device 220.

In addition, the device 220 may receive a user input of printing stored content, and the device 220 may transmit the stored content to the image forming apparatus 210. The image forming apparatus 210 may receive the content from the device 220 and perform an image forming operation on the received content.

In addition, the image forming apparatus 210 may transmit status information of the image forming apparatus 210 to the device 220, and the device 220 may display the status information of the image forming apparatus 210 for the user in the form of notification. When the device 220 receives a user input of selecting the notification, the image forming apparatus 210 may transmit specific status information of the image forming apparatus 210 to the device 220, and the device 220 may receive the specific status information of the image forming apparatus 210 and display the received specific status information of the image forming apparatus 210.

However, the embodiment is not limited thereto. The image forming apparatus 210 may perform various operations according to a user input.

On the other hand, when the image forming apparatus 210 is connected to the device 220, the image forming apparatus 210 receives the user information from the device 220, performs the user authentication for the image forming apparatus 210 by using the received user information, and performs the user information based on the result of the user authentication, but the embodiment is not limited thereto. When the image forming apparatus 210 is connected to the device 220, the image forming apparatus 210 may the above-described various operations without performing the user authentication.

Operations S210 to S240 briefly show the communication method between the image forming apparatus and the device for convenience of description, and the present disclosure is not limited thereto. Specific operations may be omitted and addition operations may be further performed.

Figure 3:
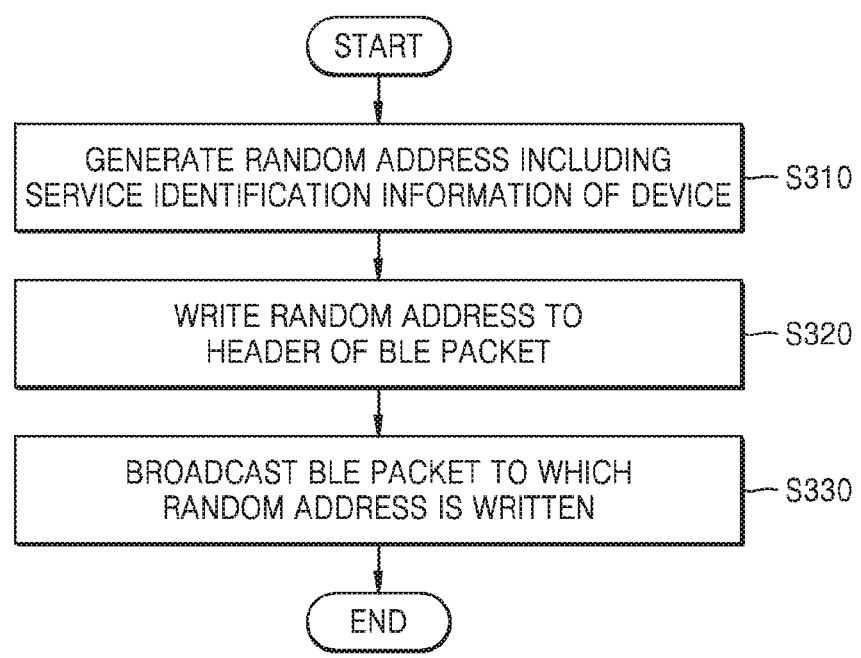
FIG. 3 is a flowchart of a method by which a device broadcasts a BLE packet, according to an embodiment.

FIG. 3 is a flowchart of a method by which a first device 10 broadcasts a BLE packet, according to an embodiment.

In operation S310, the first device 10 may generate a random address including service identification information of the first device 10.

According to an embodiment, a random address of a BLE packet may be information used when a second device 20 receiving the BLE packet is connected to the first device 10 or request a connection to the first device 10. According to an embodiment, since the random address of the BLE packet is not a unique value, the random address of the BLE packet may be generated or updated as a new value by the first device 10.

According to an embodiment, the service identification information may mean information for identifying a service provided by the first device 10. For example, the service identification information may include an identifier indicating a service, such as a mobile hotspot service, a content sharing service, or a screen mirroring service, an identifier indicating a supported communication standard (e.g., UPnP, DLNA, etc.), and an identifier indicating an application or program required for communication connection, but is not limited thereto.

In addition, the service identification information may be information corresponding to a specific communication connection service. According to an embodiment, service information including an application, a communication method, or a protocol, which is required for a specific communication connection service, may be preset or prearranged by mapping with the service identification information. In this case, the service information corresponding to the service identification information (e.g., a communication connection service indicated by the service identification information) may be prestored in memories of devices to be involved in the communication service (e.g., the second device 20).

The service identification information of the first device 10 may include information used for changing an AP from a sleep mode to an awake mode in the second device 20 that receives the BLE packet. For example, all pieces of the service identification information of the first device 10 may be used as filtering information for changing the operating mode of the AP in the second device 20, and some pieces of the service identification information of the first device 10 may be used as filtering information for changing the operating mode of the AP in the second device 20.

According to an embodiment, the first device 10 may generate a hash value for the service identification information by using a hash algorithm. The first device 10 may generate a random address by using the generated hash value. Details will be described with reference to FIG. 4.

Figure 4:
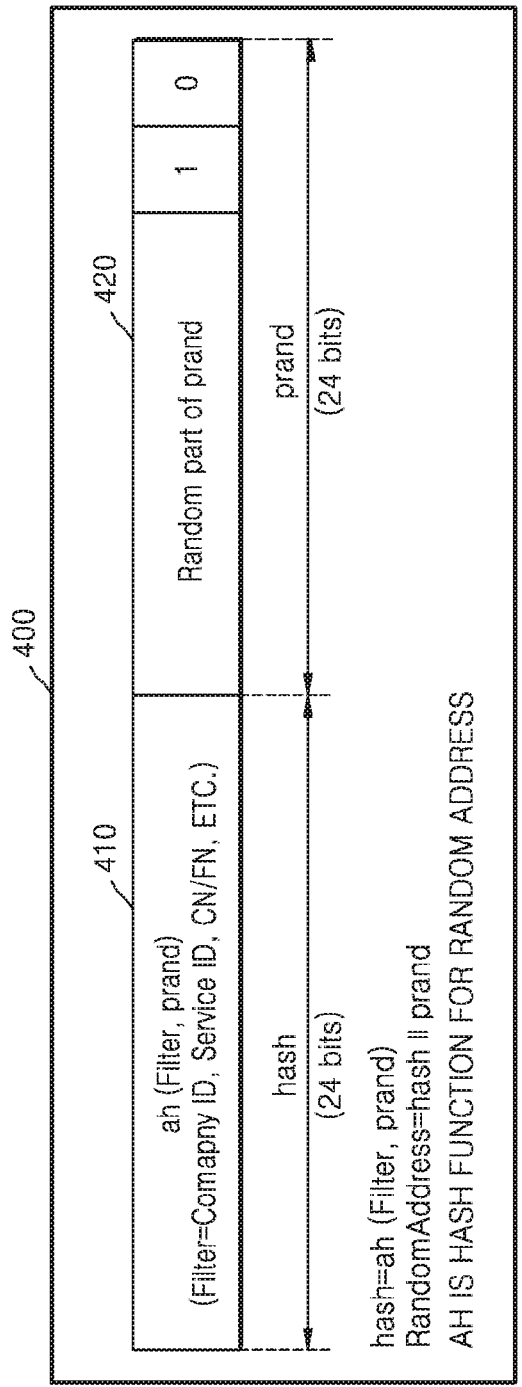
FIG. 4 is a diagram for describing a random address according to an embodiment.

FIG. 4 is a diagram for describing a random address 400 according to an embodiment. In FIG. 4, it is assumed that a total length of the random address 400 is 48 bits.

As illustrated in FIG. 4, the random address 400 may include a hash value 410 for the service identification information of the first device 10, and a random value 420 of predetermined bits. For example, the first device 10 may generate the hash value 410 of 24 bits for the service identification information by using a predetermined hash function. In addition, the first device 10 may generate the random value 420 of 24 bits by using a predetermined random function for filling the remaining part of the random address 400.

In FIG. 4, each of the hash value 410 and the random value 420 is assumed to be 24 bits, but is not limited thereto. For example, the hash value 410 may be 18 bits and the random value 420 may be 30 bits.

According to an embodiment, the first device 10 may generate a random address that further includes company identification information. For example, the first device 10 may generate the hash value 410 for the service identification information and the company identification information and generate the random address by adding the random value 420 to the generated hash value 410.

According to another embodiment, the first device 10 may generate a random address that does not include the service identification information and includes only the company identification information.

According to an embodiment, the first device 10 may generate a random address that further includes information about a total number of packets and identification information of a current packet. For example, when the total number of packets broadcast by the first device 10 is four and the current packet is the second packet, information such as "Current Number/Final Number=2/4" may be converted into the hash value 410. The first device 10 may generate a random address that includes the converted hash value 410.

In operation S320 of FIG. 3, the first device 10 may write the random address to a header of the BLE packet.

For example, the first device 10 may write the random address including the service identification information to a random address field of the header of the BLE packet. According to an embodiment, the random address field may include a first part to which the hash value for the service identification information is written, and a second part to which the random value is written.

In operation S330, the first device 10 may broadcast (or transmit) the BLE packet to which the random address is written.

According to an embodiment, the first device 10 may broadcast the BLE packet at a predetermined interval (e.g., 100 ms). According to an embodiment, the predetermined interval may be adjusted by the first device 10 or the user.

When the first device 10 generates a plurality of BLE packets, the first device 10 may sequentially broadcast the plurality of BLE packets.

Figure 5:
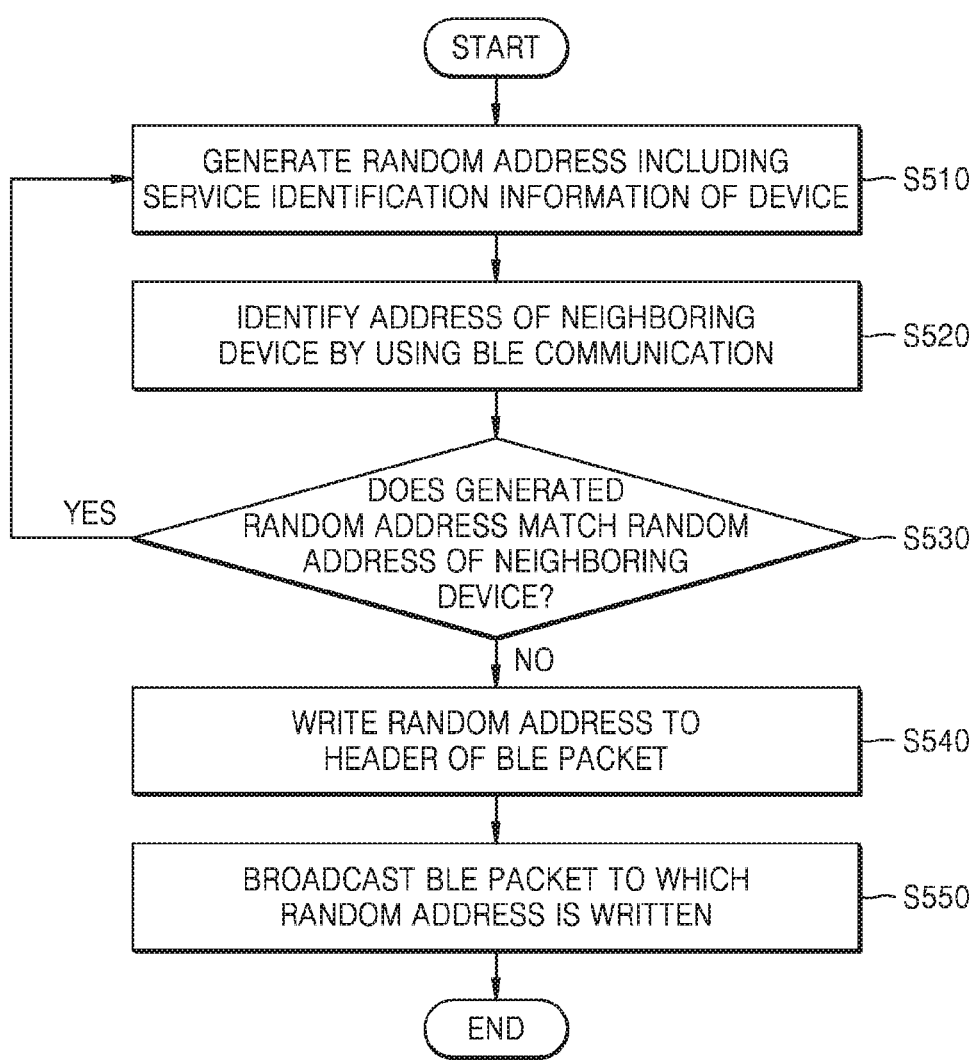
FIG. 5 is a flowchart of a method of generating a random address, according to an embodiment.

FIG. 5 is a flowchart of a method of generating a random address, according to an embodiment.

In operation S510, the first device 10 may generate a random address including service identification information of the first device 10. Since operation 510 corresponds to operation 310 of FIG. 3, detailed descriptions thereof will be omitted.

In operation S520, the first device 10 may identify an address of a neighboring device by using a BLE communication.

For example, the first device 10 may discover and scan the neighboring device by performing a BLE scan. In this case, the first device 10 may receive an advertising packet broadcast by the neighboring device. The first device 10 may identify the address of the neighboring device by extracting the random address from the received advertising packet.

In operation S530, the first device 10 may determine whether the generated random address matches the random address of the neighboring device.

When it is determined that the generated random address matches the random address of the neighboring device, the first device 10 may regenerate the random address. According to an embodiment, since the hash value for the service identification information cannot be changed, the first device 10 may regenerate the random value except for the hash value in the random address.

For example, when the random address generated by the first device 10 is 001247184818 and the random address of the scanned device is also 001247184818, the first device 10 may regenerate the remaining latter part except for the hash value of 24 bits. For example, the regenerated random address may be 001247103456.

In operation S540, when it is determined that the generated random address does not match the random address of the neighboring device, the first device 10 may write the generated random address to the header of the BLE packet.

In operation S550, the first device 10 may broadcast the BLE packet to which the random address is written.

Since operations S540 and S550 correspond to operations S320 and S330 of FIG. 3, detailed descriptions thereof will be omitted. According to embodiments, the order of operations S510 to S550 may be changed, or some of operations S510 to S550 may be omitted.

Hereinafter, a method by which the second device 20 receives the BLE packet and controls the operating mode of the AP based on filtering information included in the BLE packet will be described in detail with reference to FIG. 6.

Figure 6:
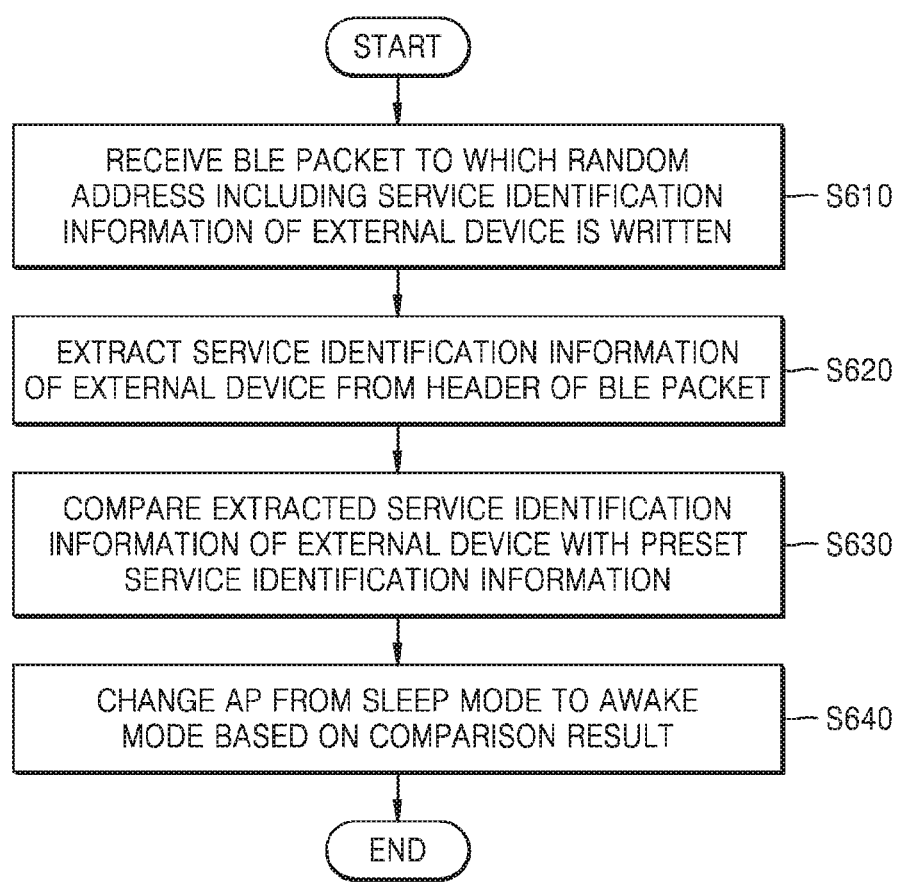
FIG. 6 is a flowchart of a method of controlling an operating mode of an application processor (AP), according to an embodiment.

FIG. 6 is a flowchart of the method of controlling the operation mode of the AP, according to an embodiment.

In operation S610, the second device 20 may receive the BLE packet from the first device 10. According to an embodiment, the random address including the service identification information of the first device 10 may be written in the header of the received BLE packet. The random address may include a hash value for the service identification information of the first device 10, and a random value of predetermined bits.

According to another embodiment, at least one of company identification information of the first device 10, information about a total number of packets, and identification information of a current packet may be further included in the header of the BLE packet received from the first device 10.

In operation S620, the second device 20 may extract the service identification information of the first device 10 from the header of the BLE packet. For example, the second device 20 may extract the service identification information of 24 bits from the random address field of the header of the BLE packet.

According to another embodiment, the second device 20 may further extract at least one of company identification information of the first device 10, information about a total number of packets, and identification information of a current packet from the header of the BLE packet.

In operation S630, the second device 20 may compare the service identification information of the first device 10 with service identification information preset in relation to the change of the operating mode of the AP.

According to an embodiment, the service identification information preset to the second device 20 in relation to the change of the operating mode of the AP may include a filtering value for waking up the AP that is in the sleep mode.

According to an embodiment, the second device 20 may set the service identification information related to the change of the operating mode of the AP. According to an embodiment, the second device 20 may set the service identification information related to the change of the operating mode of the AP, based on a user input or selection.

For example, when the second device 20 intends to use a mobile hotspot service of an external device, the second device 20 may set the service identification information corresponding to the mobile hotspot service as filtering reference identification information related to the change of the operating mode of the AP.

According to another embodiment, the second device 20 may compare the company identification information of the first device 10, which is extracted from the header of the BLE packet, with company identification information preset in relation to the change of the operating mode of the AP.

In operation S640, the second device 20 may change the AP from the sleep mode to the awake mode, based on a comparison result.

For example, the second device 20 may change the AP from the sleep mode to the awake mode when the extracted service identification information of the first device 10 matches the preset service identification information or when a similarity between the extracted service identification information of the first device 10 and the preset service identification information is a threshold value (e.g., 90%) or more.

On the other hand, the second device 20 may maintain the operating mode of the AP in the sleep mode when the extracted service identification information of the first device 10 does not match the preset service identification information or when the similarity between the extracted service identification information of the first device 10 and the preset service identification information is less than a threshold value (e.g., 90%).

According to another embodiment, the second device 20 may change the AP from the sleep mode to the awake mode when the company identification information of the first device 10, which is extracted from the header of the BLE packet, matches the company identification information, which is preset in relation to the change of the operating mode of the AP, or when a similarity between the company identification information of the first device 10, which is extracted from the header of the BLE packet, and the company identification information, which is preset in relation to the change of the operating mode of the AP is a threshold value or more.

Therefore, according to an embodiment, the second device 20 wakes up the AP only when a predetermined event occurs (e.g., the BLE packet including the preset service identification information is received), thus minimizing standby power of the AP.

According to embodiments, the order of operations S610 to S640 may be changed, or some of operations S610 to S640 may be omitted.

Figure 7:
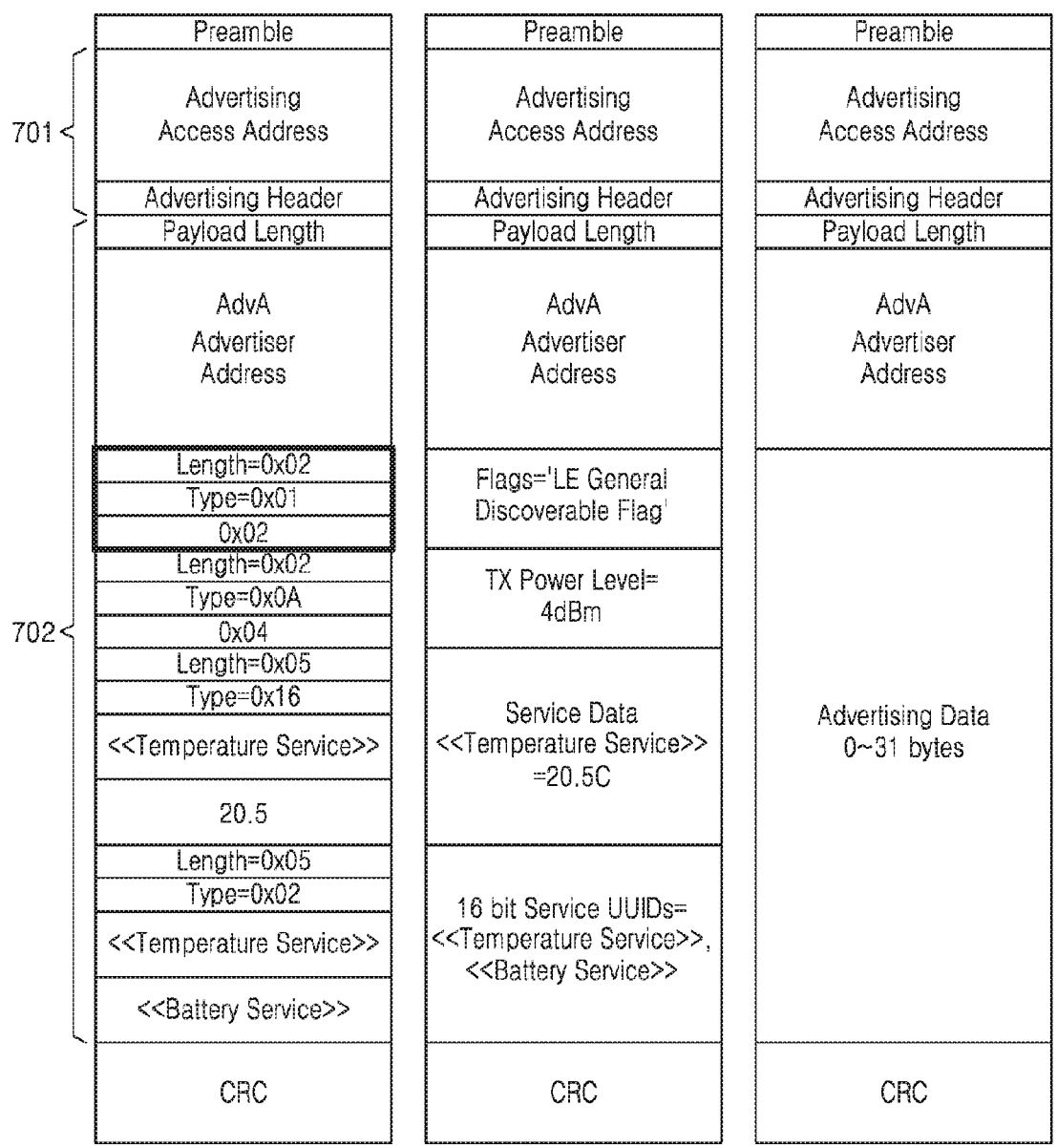
FIG. 7 is a diagram for describing a BLE packet according to an embodiment.

FIG. 7 is a diagram for describing the BLE packet according to an embodiment.

As illustrated in FIG. 7, according to an embodiment, the BLE packet may include a header part 701 and a payload part 702. According to an embodiment, the header part 701 of the BLE packet may include a random address field.

Therefore, a device according to an embodiment may generate a random address and write the generated random address to the random address field of the header part 701 of the BLE packet. According to an embodiment, the random address may be 48 bits. However, the random address is not limited thereto. The size of the random address may be differently set within a range understood by those of ordinary skill in the art.

According to an embodiment, the payload part 702 of the BLE packet may be 31 bytes. However, the payload part is not limited thereto. The size of the payload may be differently set within a range understood by those of ordinary skill in the art. The limited size of the BLE packet makes it difficult for the device to transmit a large amount of data.

Figure 8:
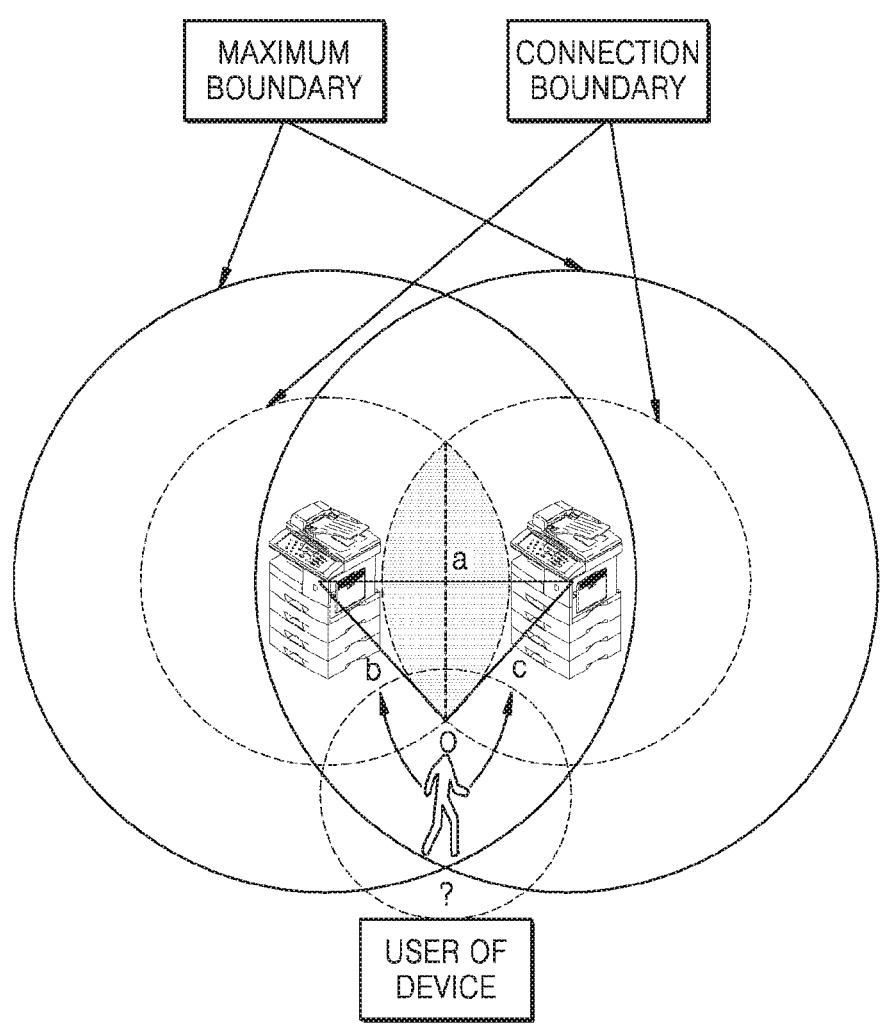
FIG. 8 is a diagram illustrating a case where interference occurs when a user of a device performs a Bluetooth connection.

FIG. 8 is a diagram illustrating a case where interference occurs when a user of a device performs a Bluetooth connection.

As illustrated in FIG. 8, the user of the device may approach an image forming apparatus so as to use the image forming apparatus. For example, the user of the device may approach the image forming apparatus so as to use a print function or a file transfer function. The user may attempt to perform a BLE communication for wireless connection between the device of the user and the image forming apparatus.

In a case where the user with the device approaches the image forming apparatus, a plurality of image forming apparatuses may be located adjacent to the device. For example, due to a moving line of the user intending to use the image forming apparatus in an office environment, space constraints, output noise, or power supply, a plurality of image forming apparatuses may be located at one place. In this case, when the user of the device approaches one image forming apparatus so as to use the image forming apparatus, the device may discover a plurality of image forming apparatuses capable of communicating with the device. Thus, the user or the device may have difficulty in determining the image forming apparatus to be connected. The device may be connected to an unintended image forming apparatus.

Figure 9:
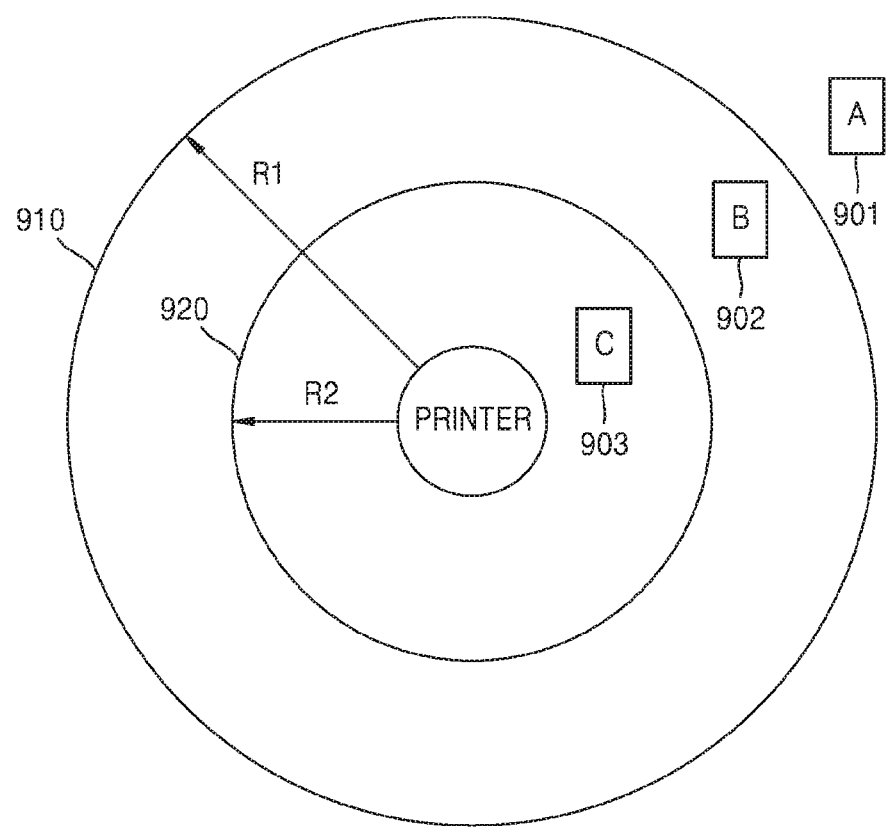
FIG. 9 is a diagram illustrating a maximum boundary and a connection boundary of an image forming apparatus, according to an embodiment.

FIG. 9 is a diagram illustrating a maximum boundary 910 and a connection boundary 920 of an image forming apparatus, according to an embodiment.

As illustrated in FIG. 9, the image forming apparatus may have two boundaries. One is the maximum boundary 910 and the other is the connection boundary 920. Hereinafter, the maximum boundary 910 and the connection boundary 920 will be described in detail.

The maximum boundary 910 means a maximum BLE RF boundary at which the BLE packet is transmittable for a BLE communication in the image forming apparatus. For example, in the image forming apparatus such as a printer, the maximum boundary 910 may be a maximum range of a packet transmitted for discovering the device such as a smart phone. The maximum boundary 910 of the image forming apparatus may be changed according to the performance of the image forming apparatus and may be set to a specific range by the user or the internal criteria of the image forming apparatus.

In a case where the image forming apparatus receives a connection request message, the connection boundary means a boundary for specifying only a reception of a predetermined signal strength or more as a connection target. For example, the image forming apparatus, such as a printer, may receive connection request messages from a plurality of smart phones. When a connection request message having a predetermined signal strength or more is received, a corresponding smart phone may be specified as a connection target. The connection boundary 920 may be set to a specific range by the user or the internal criteria of the image forming apparatus.

As illustrated in FIG. 9, the maximum boundary 910 has a radius R1 from the center of the printer and the connection boundary 920 has a radius R2 from the center of the printer. In general, the radius R1 of the maximum boundary 910 is larger than the radius R2 of the connection boundary 920.

However, in some cases, the radius R2 of the connection boundary 920 may be equal to or less than the radius R1 of the maximum boundary 910.

As illustrated in FIG. 9, a device A 901, a device B 902, and a device C 903 may be located at different distances from the printer. The device A 901, the device B 902, and the device C 903 may approach the printer, may become far away from the printer, or may be fixed.

Since the device A 901 is located outside the maximum boundary 910 of the printer, the device A 901 may not receive a packet broadcast by the printer. In addition, even if the device A 901 transmits a connection request message for connection to the printer, the connection request message does not satisfy the predetermined signal strength because the device A 901 is located outside the connection boundary 920 of the printer. Thus, the printer does not specify the device A 901 as the connection target.

Since the device B 902 is located inside the maximum boundary 910 of the printer, the device B 902 may receive a packet broadcast by the printer. Therefore, the device B 902 may identify the existence of the printer. However, even if the device B 902 transmits a connection request message for connection to the printer, the connection request message does not satisfy the predetermined signal strength because the device B 902 is located outside the connection boundary 920 of the printer. Thus, the printer does not specify the device B 902 as the connection target.

Since the device C 903 is located inside both the maximum boundary 910 and the connection boundary 920 of the printer, the device C 903 may receive a packet broadcast by the printer. The printer may receive a connection request message transmitted by the device C 903. The printer may specify the device C 903 as a BLE communication target and may perform a procedure, such as authentication, to use a communication service with the device.

However, the above case relates to a case where one image forming apparatus is located. In a case where a plurality of image forming apparatus are located in a neighboring space, the device may confuse with the desired image forming apparatus. Thus, the device may be connected to an unintended image forming apparatus.

Hereinafter, in a case where a plurality of image forming apparatuses are located adjacent to one another, a method of reducing interference occurring in the image forming apparatuses will be described.

Figure 10:
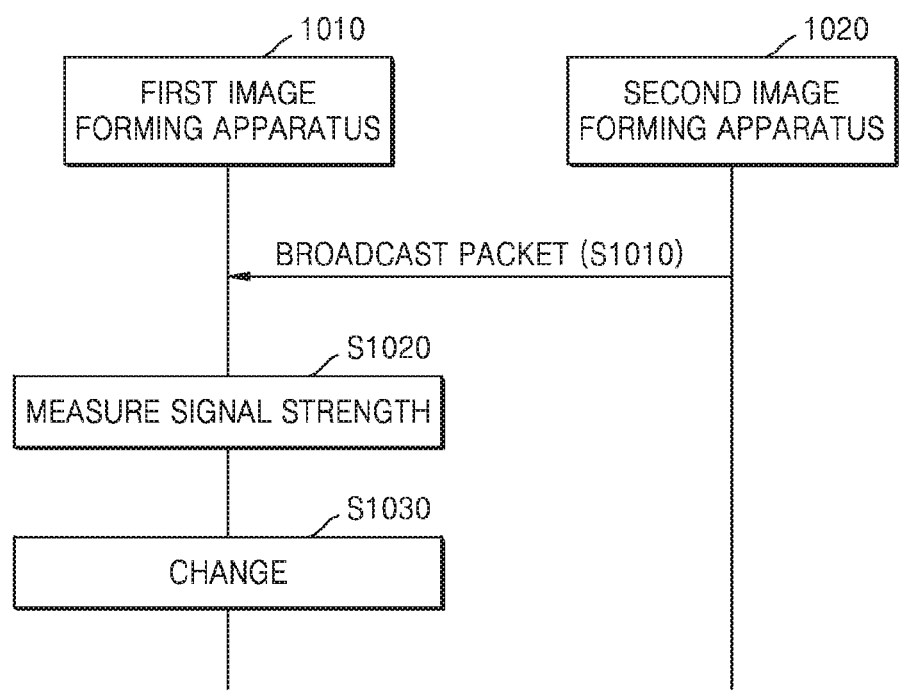
FIGS. 10 and 11 are flowcharts of a process of reducing interference between image forming apparatuses, according to an embodiment.
Figure 11:
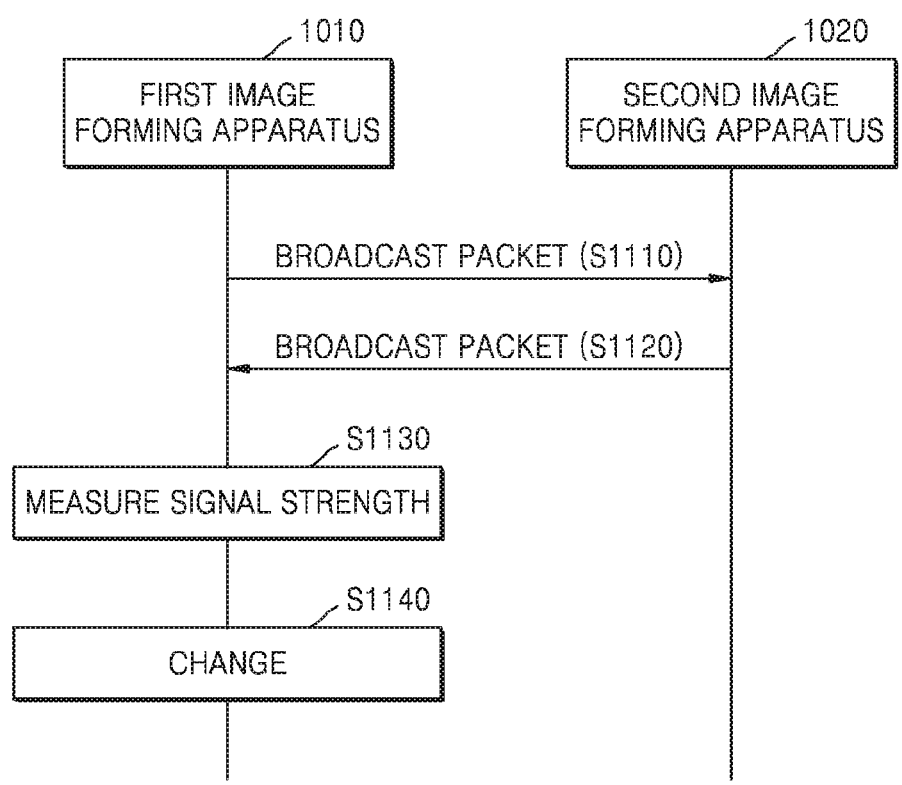

FIGS. 10 and 11 are flowcharts of a process of reducing interference between image forming apparatuses, according to an embodiment.

As illustrated in FIG. 10, interference may be reduced by measuring a signal strength between adjacent image forming apparatuses.

In operation S1010, a first image forming apparatus 1010 may receive a packet broadcast by a second image forming apparatus 1020. In a case where the first image forming apparatus 1010 and the second image forming apparatus 1020 are located adjacent to each other, the first image forming apparatus 1010 may be located inside the maximum boundary of the second image forming apparatus 1020 and receive a packet broadcast by the second image forming apparatus 1020.

In operation S1020, the first image forming apparatus 1010 may measure a signal strength of the packet broadcast by the second image forming apparatus 1020. The first image forming apparatus 1010 may include a signal strength measurer configured to measure a strength of a received signal. The signal strength measurer may measure the signal strength of the packet broadcast by the second image forming apparatus 1020. In a case where the second image forming apparatus 1020 periodically broadcasts packets, the signal strength measurer of the first image forming apparatus 1010 may measure the signal strength of each of the received packets.

A controller of the first image forming apparatus 1010 may convert the measured signal strength into a separation distance between the first image forming apparatus 1010 and the second image forming apparatus 1020. For example, when the signal strength of the packet broadcast by the second image forming apparatus 1020 is 10 dBm, the controller of the first image forming apparatus 1010 may determine that the second image forming apparatus is located about 10 m away from the first image forming apparatus 1010. In order to convert the strength of the received signal into the distance in the first image forming apparatus 1010, a distance-to-signal strength database may be prestored in a storage.

In addition, the controller of the first image forming apparatus 1010 may convert a signal strength value into a distance, based on the maximum boundary and the connection boundary set by the first image forming apparatus 1010. For example, the maximum boundary of the first image forming apparatus 1010 may be set to about 15 m from the first image forming apparatus 1010, and a connection reference strength, which defines the connection boundary of the first image forming apparatus 1010, may be set to the signal strength of about 4 dBm. In this case, the controller of the first image forming apparatus 1010 may convert 4 dBm, the connection reference strength of the first image forming apparatus 1010, into the distance value of 12 m. That is, the connection boundary of the first image forming apparatus 1010 is set to 12 m from the first image forming apparatus 1010.

In operation S1030, the first image forming apparatus 1010 may change the connection reference strength of the first image forming apparatus 1010 so as not to overlap the connection boundary of the second image forming apparatus 1020. The connection reference strength after the change may be greater than the connection reference strength before the change. For example, the signal strength of the connection boundary of the first image forming apparatus 1010 may be set to be higher than before, for example, from about 4 dBm to about 6 dBm. In a case where the controller of the first image forming apparatus 1010 sets the signal strength of the connection boundary to be high, the first image forming apparatus 1010 specifies the transmission side of the signal having a higher strength of a received signal as a connection target. That is, a device located closer to the first image forming apparatus 1010 may be specified as a connection target. For example, in a case where the signal strength of the connection boundary is set to about 4 dBm, devices located within a distance of about 12 m from the first image forming apparatus 1010 may be specified as the connection target. However, in a case where the signal strength of the connection boundary is set to about 6 dBm, devices located within a distance of 9 m from the first image forming apparatus 1010 may be specified as the connection target. Therefore, when the user of the device further approaches the image forming apparatus, the device may become the connection target of the image forming apparatus.

Additionally, in a case where the first image forming apparatus 1010 communicates with one device via the BLE connection, if other device approaches, the first image forming apparatus 1010 may broadcast a packet including status information of the first image forming apparatus 1010.

For example, in order to prevent redundant connection to other device except for the device that is communicating with the first image forming apparatus 1010, the first image forming apparatus 1010 may broadcast a packet including information indicating impossibility of additional connection to the packet. In addition to the method of including the status information in the packet, the first image forming apparatus 1010 may transmit information indicating impossibility of additional connection to other devices that approach the first image forming apparatus 1010 by using a communication method such as Wi-Fi.

In a case where the first image forming apparatus 1010 cannot output an image due to an error or the like, the first image forming apparatus 1010 may transmit, to the device, information indicating printing impossibility in response to a connection request from the device or the like, and the user of the device may receive the information and confirm the status information of the first image forming apparatus 1010.

In addition, in a case where the first image forming apparatus 1010 cannot directly transmit the status information to the device, it is possible to guide to use an alternative image forming apparatus by transmitting the status information through other image forming apparatus (e.g., the second image forming apparatus) or the server.

As illustrated in FIG. 11, a first image forming apparatus 1110 may broadcast a packet. The first image forming apparatus 1110 may broadcast a packet so that the first image forming apparatus 1110 discovers a device or is discovered by a device. Since this has been described above in detail with reference to FIG. 2, detailed descriptions thereof will be omitted.

In operation S1110, the first image forming apparatus 1110 may broadcast a packet. A second image forming apparatus 1120, which is located adjacent to the first image forming apparatus 1110, may receive the packet broadcast by the first image forming apparatus 1110.

In operation S1120, as in the first image forming apparatus 1110, the second image forming apparatus 1120 may broadcast a packet so that the second image forming apparatus 1120 discovers a device or is discovered by a device.

Since operations S1130 and S1140 correspond to operations S1020 and S1030, detailed descriptions will be omitted.

That is, the image forming apparatus may receive packets broadcast by a plurality of image forming apparatuses located adjacent to one another and measure the signal strength of each of the received packets. In this way, each of the image forming apparatuses may change the connection reference strength thereof to a higher level. Since each of the image forming apparatuses reduces the radius of the connection boundary, it is inconvenient for the user of the device needs to further approach the image forming apparatus to be used. However, in terms of the device, it is possible to reduce a problem that the device is connected to an unintended image forming apparatus or the device attempts to connect to an unintended image forming apparatus.

Figure 12:
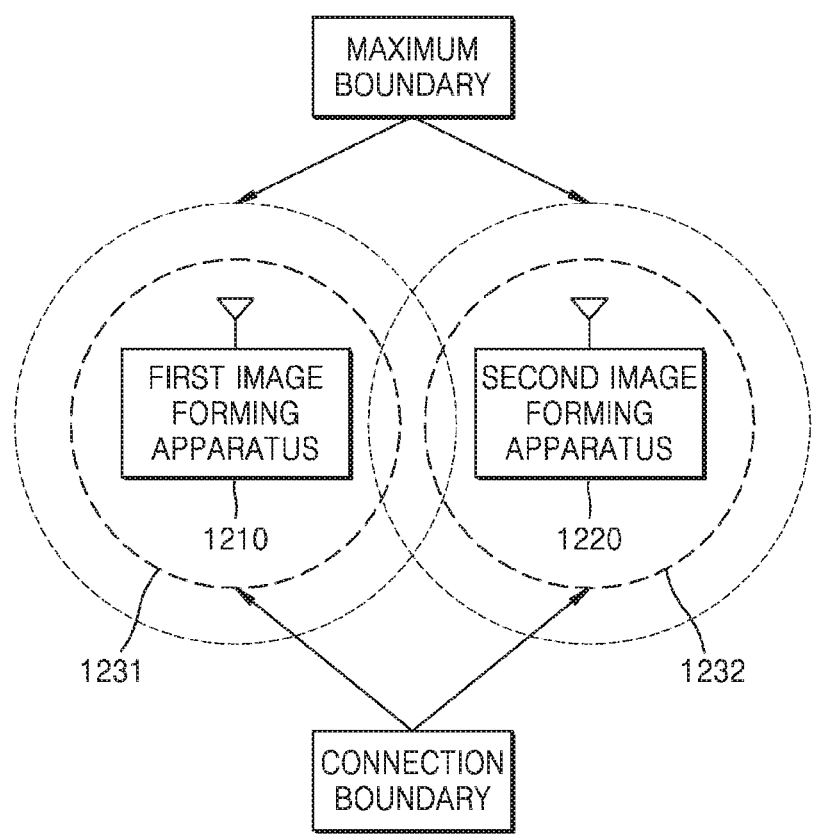
FIG. 12 is a diagram for describing minimization of interference between image forming apparatuses, according to an embodiment.

FIG. 12 is a diagram for describing minimization of interference between image forming apparatuses 1210 and 1220, according to an embodiment.

As illustrated in FIG. 12, since the first image forming apparatus 1210 changes a reference strength of a connection boundary 1231, the connection boundary 1231 of the first image forming apparatus 1210 may not overlap a connection boundary 1232 of the second image forming apparatus 1220 adjacent to the first image forming apparatus 1210.

When the connection boundary 1231 of the first image forming apparatus 1210 overlaps the connection boundary 1232 of the second image forming apparatus 1220, three cases may be assumed so as to solve the overlap.

First, the connection boundary 1232 of the second image forming apparatus 1220 may be maintained while reducing the radius of the connection boundary 1231 of the first image forming apparatus 1210. The radius of the connection boundary 1231 of the first image forming apparatus 1210 may be reduced by setting the reference strength of the connection boundary 1231 of the first image forming apparatus 1210 to a higher value than before the change. Since the connection boundary 1232 of the second image forming apparatus 1220 is maintained, the user of the device may approach the first image forming apparatus 1231 and attempt to connect to the first image forming apparatus 1231.

Second, the connection boundary 1232 of the second image forming apparatus 1220 may be reduced while maintaining the radius of the connection boundary 1231 of the first image forming apparatus 1210. When the image forming apparatus to be used by the user is the first image forming apparatus 1210, the connection boundary 1232 of the second image forming apparatus 1220 adjacent to the first image forming apparatus 1210 may be reduced while maintaining the connection boundary 1231 of the first image forming apparatus 1210. In this case, the device may transmit a signal instructing the second image forming apparatus to set the reference strength of the connection boundary 1232 to a higher level, or the first image forming apparatus 1210 may transmit a signal instructing the second image forming apparatus 1220 to set the reference strength of the connection boundary 1232 to a higher level. The first image forming apparatus 1210 and the second image forming apparatus 1220 may be in a state of being mutually connected by a management server or a wire/wireless communication. In this case, since the connection boundary 1231 of the first image forming apparatus 1210 to be used by the user of the device is maintained, the device may communicate with the first image forming apparatus 1210, without approaching the first image forming apparatus 1210, as long as the device is located within a connection boundary range.

Third, both the first image forming apparatus 1210 and the second image forming apparatus 1220 may reduce the radii of the connection boundaries 1231 and 1232. The image forming apparatuses 1210 and 1220 may reduce the radii of the connection boundaries 1231 and 1232 by setting the connection reference strengths to a higher level. The first image forming apparatus 1210 and the second image forming apparatus 1220 may be connected through a server or the like via a network, or may be connected by using other communication methods except for the BLE communication connection. In this case, a controller of the first image forming apparatus 1210 and a controller of the second image forming apparatus 1220 may mutually transmit or receive measured strengths of signals received by themselves and measured strengths of signals received from other devices.

For example, when it is determined that the overlap distance of the connection boundaries 1231 and 1232 of the first and second image forming apparatuses 1210 and 1220 is 4 m, the first and second image forming apparatuses 1210 and 1220 may share the measured strengths of the received signals with each other so as to reduce the connection boundaries 1231 and 1232 by the distance of 2 m for each other. As another example, it is possible to minimize the overlap region in such a manner that the first image forming apparatus 1210 reduces the radius of the connection boundary 1231 by 3 m and the second image forming apparatus 1220 reduces the radius of the connection boundary 1232 by 1 m.

Furthermore, there may be a case where the overlap is solved even when the connection boundary of one image forming apparatus is reduced and the connection boundary of another image forming apparatus is increased. However, the setting of increasing the radius of the connection boundary may cause a problem that the device is connected to an unintended image forming apparatus.

Figure 13:
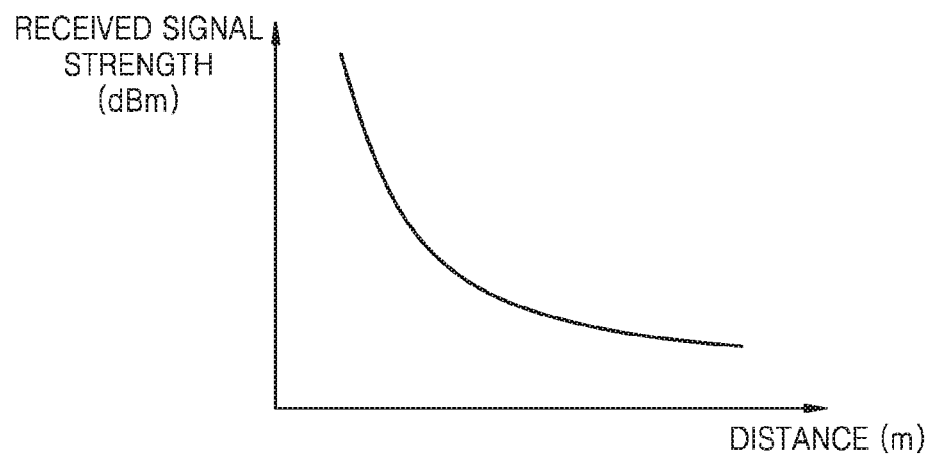
FIG. 13 is a graph showing a received signal strength with respect to a distance of an image forming apparatus, according to an embodiment.

FIG. 13 is a graph showing a received signal strength with respect to a distance of an image forming apparatus, according to an embodiment.

As illustrated in FIG. 13, the radius of the connection boundary of the image forming apparatus may be in inverse proportion to the reference strength of the connection boundary. Since the connection boundary is a boundary that is set in order for the image forming apparatus to determine a device of a transmission side as a connection target when a signal having a predetermined signal strength or more is received from the device of the transmission side, the strength of the signal is gradually reduced as a distance from the image forming apparatus increases. When the device approaches within a predetermined distance, a maximum communication strength is satisfied. Thus, a change in the strength of the signal may be small even when a distance between the device and the image forming apparatus decreases, FIG. 14 is a table showing a received signal strength with respect to a distance of an image forming apparatus, according to an embodiment.

As illustrated in FIG. 14, a storage of the image forming apparatus may store characteristics of the graph of FIG. 13 in a database in the form of a signal strength value with respect to a distance. When the device is located 10 m away from the image forming apparatus, the strength of the signal transmitted by the device may be measured as 5 dBm by the image forming apparatus. As the device approaches the image forming apparatus, the measured strength of the signal received by the image forming apparatus may be increased.

The controller of the image forming apparatus may determine how much the radius of the connection boundary needs to be reduced, based on prestored database information. That is, the controller of the image forming apparatus may determine how much the reference strength of the connection boundary needs to be reduced, based on the prestored database information.

Figure 15A:
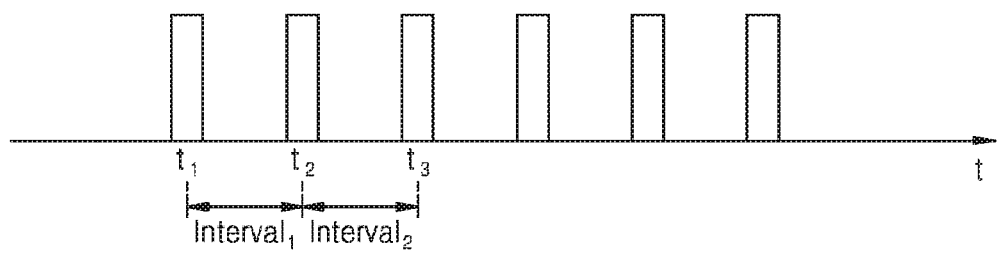
FIGS. 15A, 15B and 15C are diagrams for describing a power saving function of an image forming apparatus, according to an embodiment.
Figure 15B:
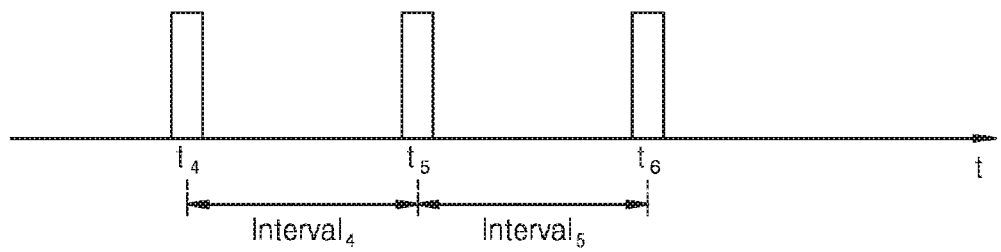
Figure 15C:
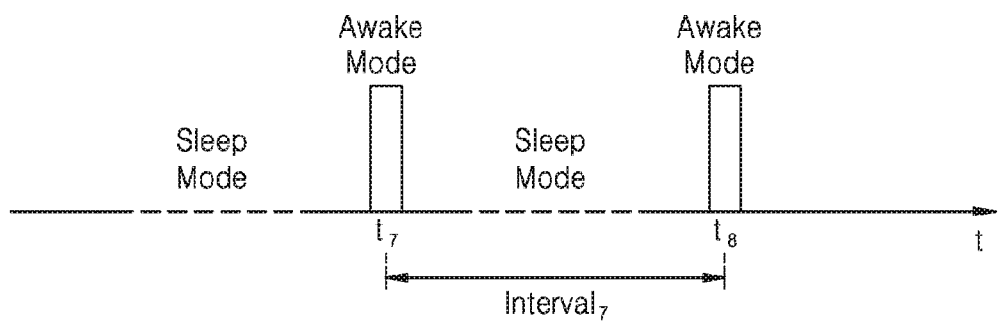

FIGS. 15A to 15C are diagrams for describing a power saving function of an image forming apparatuses, according to an embodiment.

The image forming apparatus may periodically broadcast packets so that the image forming apparatus discovers a neighboring device or is discovered by a device. In this case, if the device is not located around the image forming apparatus and thus is not found for a predetermined time, the image forming apparatus may cause unnecessary power consumption so as to broadcast the packets. Hereinafter, a method of saving power in a process of broadcasting a packet in an image forming apparatus will be described.

As illustrated in FIG. 15A, the image forming apparatus may broadcast packets at regular time intervals. A time interval interval 1 from packet broadcasting at time t1 to packet broadcasting at next time t2 may be equal to a time interval interval 2 between time t2 and time t3.

As illustrated in FIG. 15A, even if the packets are periodically broadcast, the image forming apparatus may not receive a connection request message from the device.

As illustrated in FIG. 15B, when the image forming apparatus does not receive a response signal with respect to the packets periodically broadcast for a predetermined time, the image forming apparatus may increase a time interval from packet broadcasting to next packet broadcasting. If the packet is broadcast at time t4 and the next packet is broadcast at time t5, a time interval interval 4 may be greater than a previous time interval interval 1.

As illustrated in FIG. 15C, even if the packet is broadcast at an increased time interval, the image forming apparatus may not receive a connection request message. The image forming apparatus, which does not receive the connection request message for the predetermined time, may stop the packet broadcasting and change to the sleep mode. Since the packet is not broadcast in the sleep mode, it is possible to reduce power consumption of packet broadcasting.

However, if the image forming apparatus continuously operates in the sleep mode, the image forming apparatus may not be connected to the device. Thus, the image forming apparatus may be set such that the image forming apparatus wakes up to the awake mode at each regular time interval. In the awake mode, the image forming apparatus may broadcast a packet or perform scanning so as to discover a device to be connected. The image forming apparatus may not discover a device in the awake mode. In this case, the image forming apparatus may change to the sleep mode again to thereby reduce the power consumption.

A criteria for waking up the image forming apparatus from the sleep mode to the awake mode may be various. For example, the image forming apparatus may receive a wake-up signal and change to the awake mode and may be set to wake up at each regular time interval set to the image forming apparatus. A time interval interval 7 from time t7 when the operating mode changes to the awake mode to time t8 when the operating mode changes to the next awake mode may be greater than the time interval interval 4.

Figure 16:
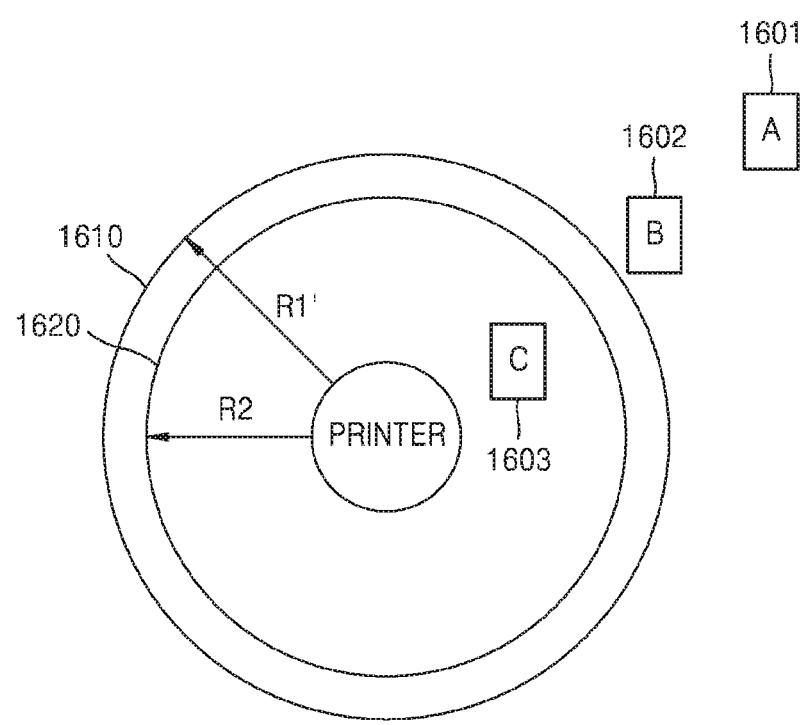
FIG. 16 is a diagram illustrating a maximum boundary radius of an image forming apparatus, according to an embodiment.

FIG. 16 is a diagram illustrating a maximum boundary radius of an image forming apparatuses, according to an embodiment.

The method of minimizing the overlap region with the image forming apparatuses by reducing the connection boundaries of the image forming apparatuses has been described above. However, since the overlap region may cause the reception of unnecessary packets and the unnecessary connection in the device, it is also possible to minimize interference signals in the device by changing the maximum boundary of the image forming apparatus instead of the connection boundary.

In the above, the method of fining the device and the image forming apparatus and specifying the connection target according the maximum boundary radius R1 and the connection boundary radius R2 of the image forming apparatus and the distance between the device and the image forming apparatus has been described with reference to FIG. 9.

The maximum boundary means a maximum boundary at which a frequency is transmitted for a BLE communication in the image forming apparatus. For example, in the image forming apparatus such as a printer, the maximum boundary may be a maximum range of a packet broadcast for discovering the device such as a smart phone. The maximum boundary of the image forming apparatus may be changed according to the performance of the image forming apparatus and may be set to a specific range by the user or the internal criteria of the image forming apparatus.

The controller of the image forming apparatus may adjust the strength of the packet signal to be broadcast. By reducing the strength of the packet signal, the maximum boundary radius of the image forming apparatus also may be proportionally reduced.

As illustrated in FIG. 16, the image forming apparatus may reduce the radius R1 of the maximum boundary 910 in FIG. 9 to R1' 1610. In this case, a device A 1601 and a device C 1603 may be in the same condition as in FIG. 9. Since the device A 1601 is located outside the maximum boundary 1610 of the image forming apparatus, the device A 1601 may not receive the packet broadcast by the printer. In addition, even if the device A 1601 transmits a connection request message for connection to the image forming apparatus, the connection request message does not satisfy a predetermined signal strength because the device A 1601 is located outside the connection boundary 1620 of the image forming apparatus. Thus, the image forming apparatus does not specify the device A 1601 as the connection target. Since the device C 1603 is located inside both the maximum boundary 1610 and the connection boundary 1620 of the image forming apparatus, the device C 1603 may receive a packet broadcast by the image forming apparatus. The image forming apparatus may receive a connection request message transmitted by the device C 1603. The image forming apparatus may specify the device C 1603 as a BLE communication target and may perform a procedure, such as authentication, to use a communication service with the device.

Unlike the device A 1601 and the device C 1603, the device B 1602 may be in a different condition from the device B 902 of FIG. 9. Since the maximum boundary radius of the image forming apparatus is reduced from R1 910 to R1' 1610, the device B 1602 is located outside the maximum boundary 1610 of the image forming apparatus and is in the same condition as the device A 1601. Therefore, the packet broadcast by the image forming apparatus may not reach the device B 1602, thus reducing a confusion occurring when the device specifies the connection target.

Since the maximum boundary of the image forming apparatus is reduced, the user of the device needs to further approach the image forming apparatus so as to use the image forming apparatus. However, there is an advantageous effect that the device does not receive a packet broadcast by an unintended image forming apparatus.

As described above, the method of reducing the unnecessary interference signal by changing the connection boundary and/or the maximum boundary of the image forming apparatus may be performed by the device as well as the image forming apparatus.

For example, the communication connection relates to the case where the user approaches the image forming apparatus so as to output an image stored in the smart phone, but is not necessarily limited to the communication between the image forming apparatus and the device. The communication connection may be applied to any communication connection between a first device and a second device.

For example, the first device may be a smart phone and the second device may be a display device instead of the image forming apparatus. In a case where the smart phone approaches the display device that is a target for the communication connection, it is possible to reduce an unnecessary interference signal by changing a connection boundary and/or a maximum boundary.

As another example, in a case where the smart phone approaches the display device for a communication connection to the display device, it is possible to reduce unnecessary interference signals from image forming apparatuses located around the display device. An opposite case also may be possible.

Therefore, the above-described communication connection method may be applied between devices located in an environment that can reduce unnecessary interference signals, and may be applied to a communication connection method using a BLE communication method and other communication methods similar to the BLE communication method. For example, the communication connection method may be applied any communication method capable of D2D such as Wi-Fi Direct (WFD), ZigBee, and the like.

The communication connection method will be described below in detail.

The communication connection method may include: receiving, by a first device, packet information from a second device; measuring, by the first device, a signal strength of the received packet information, and changing a connection reference strength of the first device based on the measured signal strength.

In addition, the first device may include: a communicator configured to receive the packet information from the second device; a storage configured to store the received packet information; and a controller configured to measure the signal strength of the received packet information and change the connection reference strength of the first device based on the measured signal strength.

Figure 17:
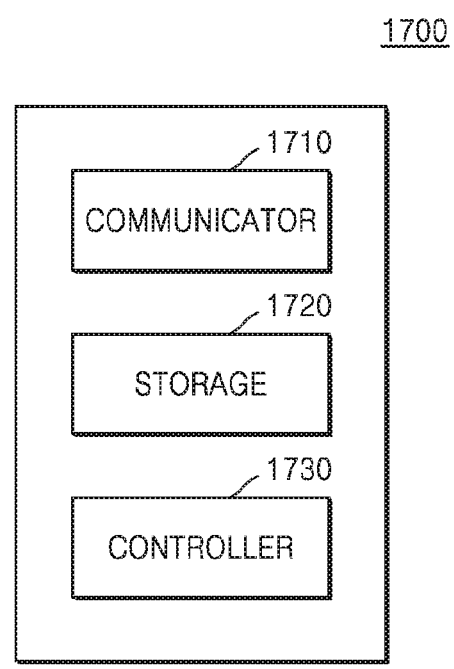
FIGS. 17, 18 and 19 are block diagrams of image forming apparatuses according to embodiments.
Figure 18:
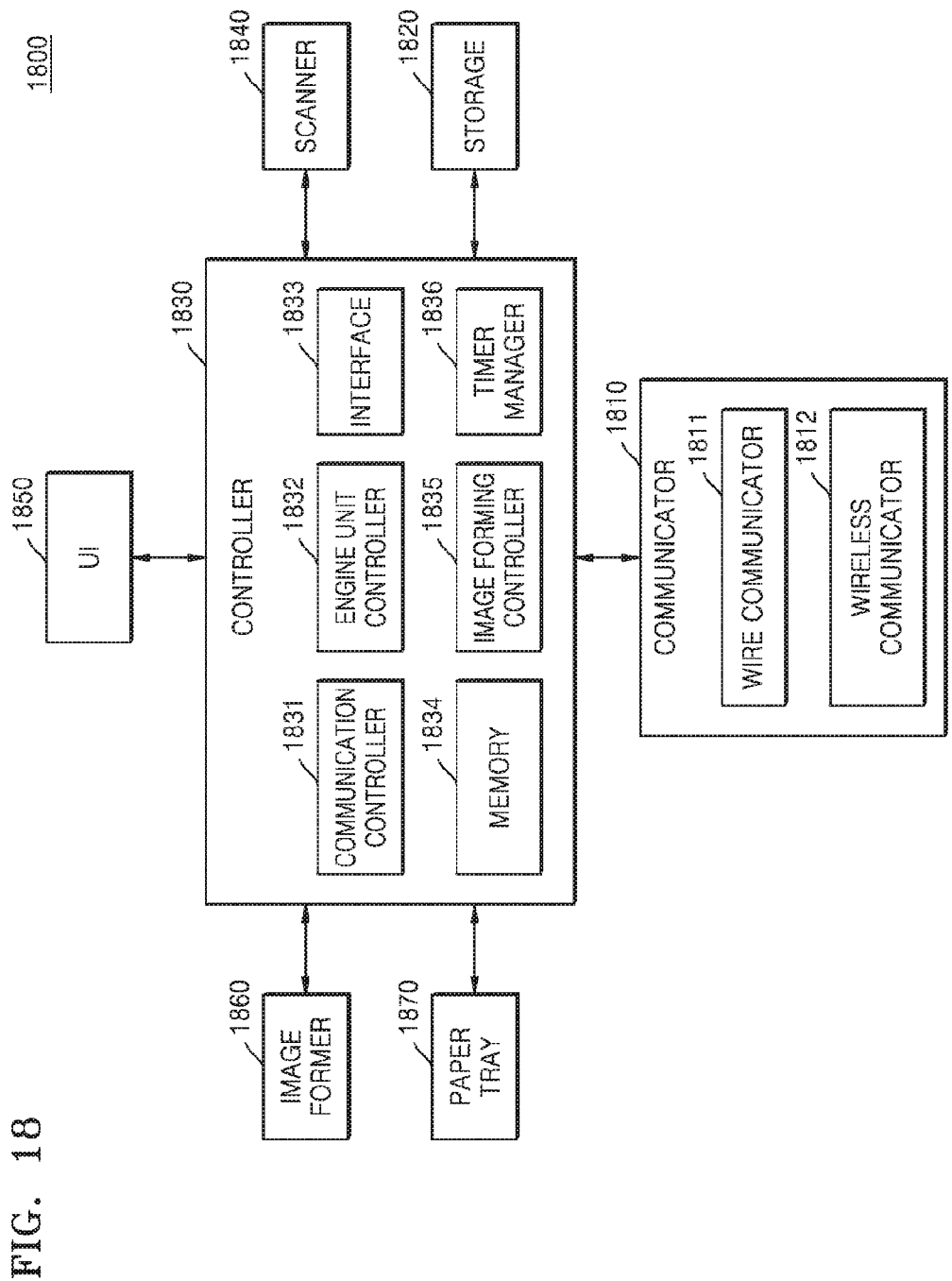
Figure 19:
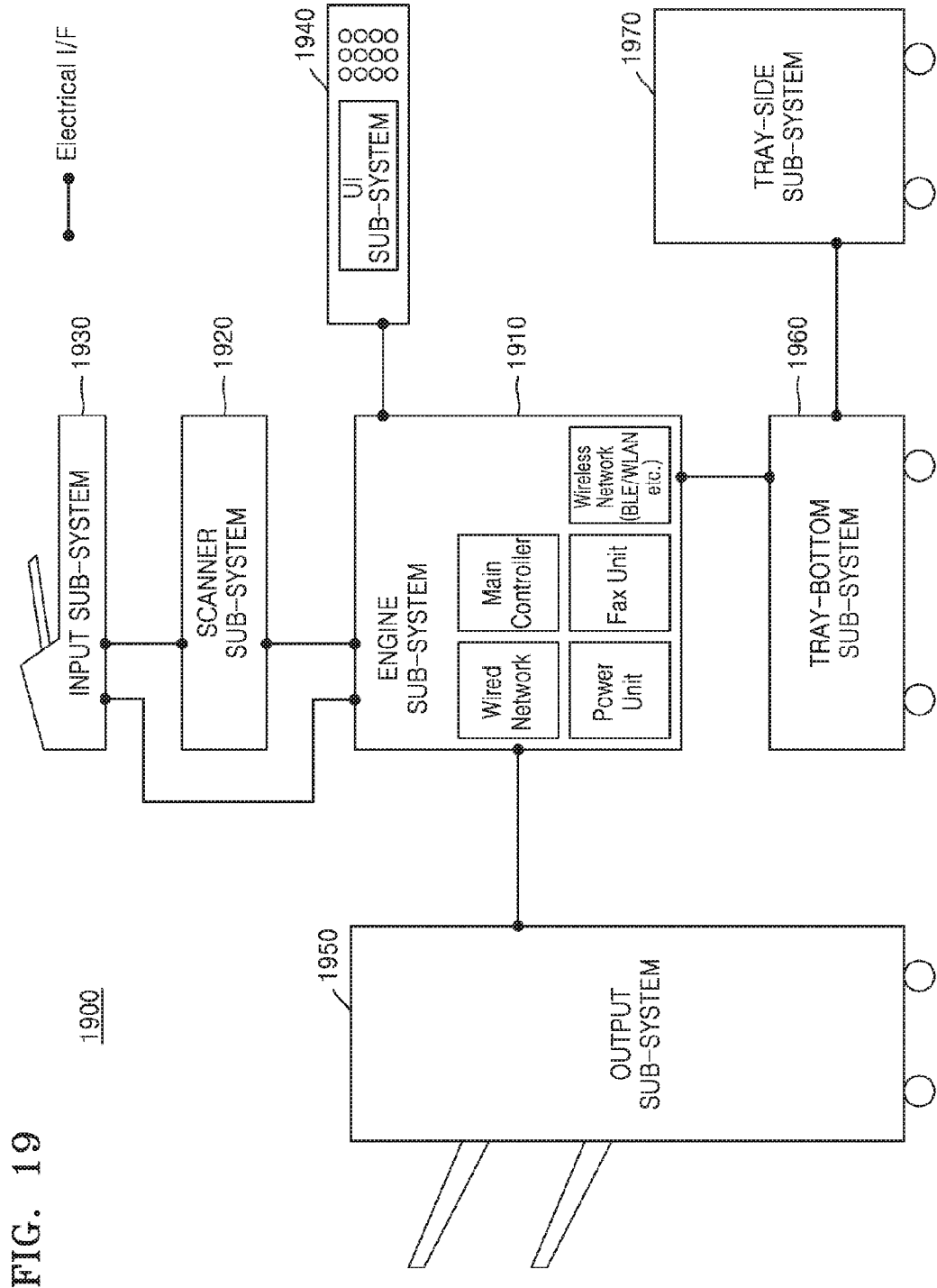

FIGS. 17 to 19 are block diagrams of image forming apparatuses 1700, 1800, and 1900 according to embodiments.

FIG. 17 is a block diagram of the image forming apparatus 1700 according to an embodiment.

Referring to FIG. 17, the image forming apparatus 1700 according to the present embodiment may include a communicator 1710, a storage 1720, and a controller 1730.

The communicator 1710 may perform a communication between image forming apparatuses or between an image forming apparatus and a device. According to an embodiment, the communicator 1710 of the image forming apparatus may perform, for example, a BLE communication. The communicator 1710 of the image forming apparatus may broadcast an advertising packet and receive a connection request message from a device or an image forming apparatus having received the packet. In addition, the communicator 1170 may perform a communication with an external device during a session connection process or by using an appropriate communication scheme in a service executing method.

The storage 1720 according to the present embodiment may store data processed inside or outside the image forming apparatus. According to an embodiment, the storage 1720 may store packet data received by the image forming apparatus. In addition, the storage 1720 may store information about signal strength measured by the image forming apparatus. The storage 1720 may store the signal strength measured by the image forming apparatus in a database with respect to each distance or each device.

The controller 1730 according to the present embodiment is configured to control the operation of the image forming apparatus 1700 and may be implemented by a processor or the like. Specifically, the controller 1730 of the image forming apparatus 1700 may measure the signal strength of the received packet information and may be set to change a connection reference strength based on the measured signal strength of the packet information.

The controller 1730 according to the present embodiment may increase a packet transmission time interval when the communicator 1720 does not receive the connection request message for a first predetermined time.

The controller 1730 according to the present embodiment may be set to scan the device so as to discover the device when the communicator 1720 does not receive the connection request message for a second predetermined time.

The controller 1730 according to the present embodiment may change the communicator 1720 from the awake mode to the sleep mode when the communicator 1720 does not receive the connection request message for the second predetermined time.

When the communicator 1720 is changed to the sleep mode, the controller 1730 according to the present embodiment may be set to change the communicator 1720 to the awake mode by a user input of the first image forming apparatus 1700.

The controller 1730 according to the present embodiment may be set to connect a session with one or more devices based on the received connection request message.

FIG. 18 is a block diagram of an image forming apparatus 1800 according to an embodiment.

Referring to FIG. 18, the image forming apparatus 1800 according to the present embodiment may include a communicator 1810, a storage 1820, a controller 1830, a scanner 1840, a UI 1850, an image former 1860, and a paper tray 1870.

The communicator 1810 according to the present embodiment may include a wire communicator 1811 and a wireless communicator 1812. In the wire communicator 1811 and the wireless communicator 1812, a network applicable herein may include a local area network (LAN), a wide area network (WAN), a value added network (VAN), a mobile radio communication network, a satellite communication network, or any combinations thereof. The network is a comprehensive data communication network that enables network configuration subjects to efficiently communicate with one another and may include a wired Internet, a wireless Internet, and a mobile wireless communication network.

The communicator 1810 according to the present embodiment may include a short-range communicator, a mobile communicator, and a broadcasting receiver. The short-range communicator may be a Bluetooth communicator, a BLE communicator, a near field communicator (NFC/RFID), a wireless local access network (WLAN) (Wi-Fi) communicator, a ZigBee communicator, an infrared data association (IrDA) communicator, a WFD communicator, an ultra wideband (UWB) communicator, or an Ant+ communicator, but is not limited thereto.

The storage 1820 according to the present embodiment may store a program for processing and control of the controller 1830 and may store input/output data (e.g., service identification information preset as filtering information, preset company identification information, etc.). The storage 1820 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

The controller 1830 according to the present embodiment may include a communication controller 1831, an engine unit controller 1832, an interface 1833, a memory 1834, an image forming controller 1835, and a timer manager 1836.

The communication controller 1831 may perform control such that the communication is efficiently performed in the communicator 1810, and the engine unit controller 1832 may control an operation of an engine unit of the image forming apparatus 1800. The interface 1833 may control data input/output and the connection to neighboring devices or modules connected from the inside or outside of the image forming apparatus 1800, and the memory 1834 may temporarily or semipermanently store information about various operations and data processed by the controller 1800. The image forming controller 1835 may control the image forming operation of the image former 1860, and the timer manager 1836 may manage the timings of various operations processed by the image forming apparatus.

The image former 1860 according to the present embodiment substantially performs the image forming operation. For example, the image former 1860 may perform an operation of printing input image data on a paper.

The paper tray 1870 according to the present embodiment may feed a paper to the image forming apparatus 1800.

FIG. 19 is a block diagram of an image forming apparatus 1900 according to an embodiment.

The image forming apparatus 1900 according to the present embodiment may include an engine sub-system 1910, a scanner sub-system 1920, an input sub-system 1930, a UI sub-system 1940, an output sub-system 1950, a tray-bottom sub-system 1960, and a tray-side sub-system 1970.

The engine sub-system 1910 according to the present embodiment may perform the above-described operations in the image forming apparatus 1900. The engine sub-system 1910 may include a wired network module or a wireless network module and may include a main controller, a power unit, and a fax unit.

The engine sub-system 1910 may include a frame, a paper input, LSU/LPH, an imaging unit, a fuser, a controller, and a power unit so as to perform charging, exposure, developing, cleaning, erasing, and fusing.

The scanner sub-system 1920 according to the present embodiment may support a scanning operation of the image forming apparatus 1900. The scan sub-system 1920 may scan a paper image input to the input sub-system 1930 or a scan plate. The input sub-system 1930 may input an original image or an original paper to the scanner sub-system 1920 so as to perform a copying, scanning, or fax operation.

The UI sub-system 1940 according to the present embodiment may display a graphic UI (GUI) screen on the image forming apparatus 1900. The UI sub-system 1940 may include a liquid crystal display (LCD) panel configured to receive an operation instruction from a user and may include a touch screen or a hard button. The UI sub-system 1940 may be displayed in a widget form and may receive a user input.

The output sub-system 1950 according to the present embodiment may output a printed matter formed by the image forming apparatus 1900 and may include a roller or the like. The output sub-system 1950 may be a system for post-processing a printed paper, such as a standard finisher and a booklet finisher. The tray-bottom sub-system 1960 and the tray-side sub-system 1970 may keep papers (e.g., A4, A3, B5, etc.) and feed the papers at the time of image formation.

A series of image forming procedures in the image forming apparatus 1900 according to the present embodiment will be described below. First, papers may be kept in the tray-bottom sub-system 1960 and the tray-side sub-system 1970. An original image to be copied may be input to the input sub-system 1930 by the user. When the user inputs a copy instruction (copying 10 sheets of A4 paper) to the UI sub-system (e.g., the copy instruction is to output ten sheets of A4 paper, the scanner sub-system 1920 may scan an original image. The engine sub-system 1910 may manage all operations and may form an image of scanned data. The user may acquire an image-formed output matter through the output sub-system 1950.

Figure 20:
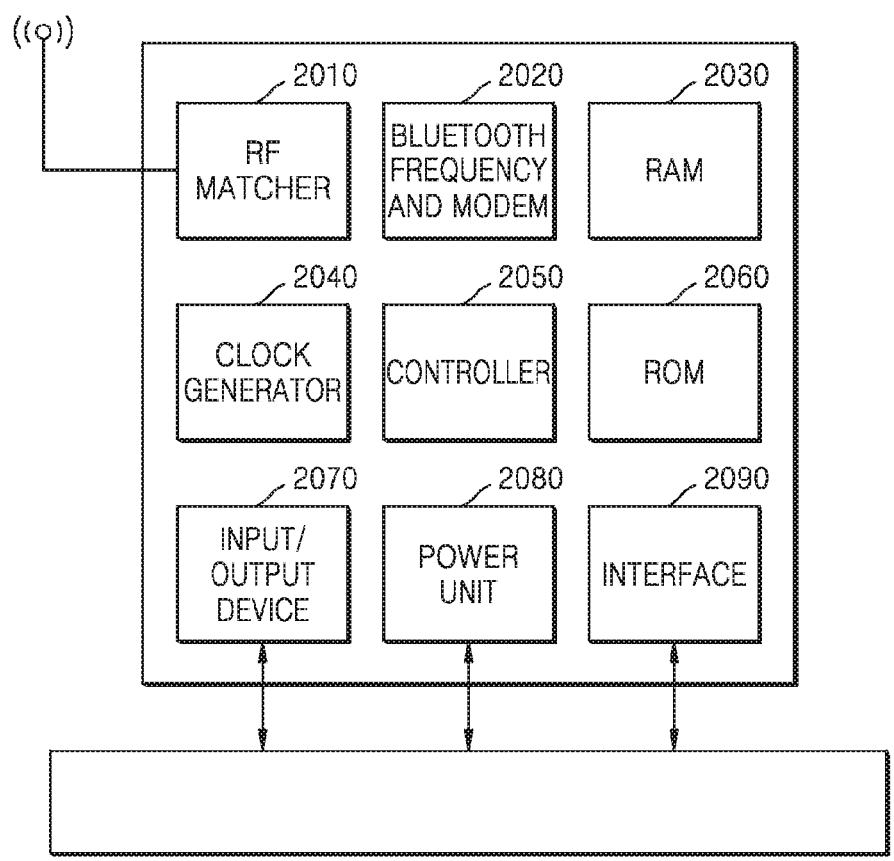
FIG. 20 is a block diagram illustrating a BLE module of an image forming apparatus, according to an embodiment.

FIG. 20 is a block diagram illustrating a BLE module 2000 of an image forming apparatus, according to an embodiment.

The BLE module 2000 according to the present embodiment may be provided as a single independent object in the image forming apparatus and may perform a BLE communication.

The BLE module 2000 according to the present embodiment may include an RF matcher 2010, a Bluetooth frequency and modem 2020, a RAM 2030, a clock generator 2040, a controller 2050, a ROM 2060, an input/output device 2070, a power unit 2080, and an interface 2090.

The RF matcher 2010 may match a Bluetooth frequency and the Bluetooth frequency and modem 2020 may include a Bluetooth frequency transmission/reception terminal. The RAM 2030 may store a Bluetooth stack and user application data, and the clock generator 2040 may generate a clock for BLE driving. The controller 2050 may drive a Bluetooth S/W stack and control the Bluetooth frequency and external interfaces. The ROM 2060 may store codes for system F/W execution, and the input/output device 2070 may be a programmable bidirectional input/output device. The power unit 2080 may manage power to be supplied from the controller 2050 for driving the BLE module 2000, and the interface 2090 may communicate with the controller 2050.

Figure 21:
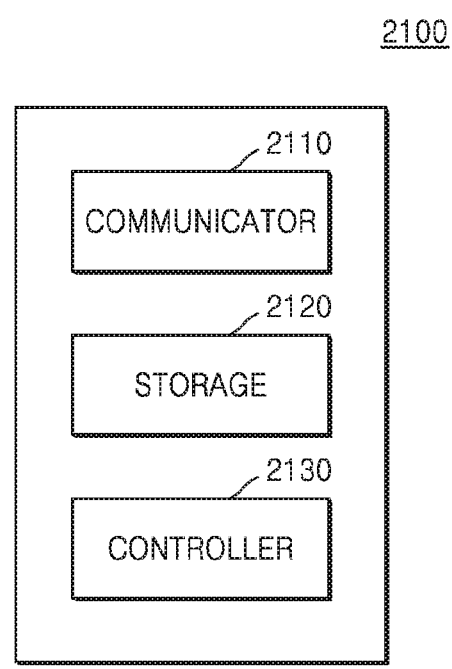
FIG. 21 is a block diagram of a device according to an embodiment.

FIG. 21 is a block diagram of a device 2100 according to an embodiment.

The device 2100 according to the present embodiment does not indicate a separate special device but indicates a device capable of BLE communication and may include any device as long as the device receives information of other devices, transmits information of relevant devices to the devices, or transmits and receive information to and from other devices.

The device 2100 according to the present embodiment may include a controller 2110, a storage 2120, and a communicator 2130. The communicator 130 may include a wireless communicator and a wired communicator.

Since the controller 2110, the storage 2120, and the communicator 2130 of the device 2100 illustrated in FIG. 21 respectively correspond to the controller 1170, the storage 1720, and the communicator 1730 of the image forming apparatus 1700 illustrated in FIG. 17, detailed descriptions thereof will be omitted.

The device 2100 may perform a general function as a mobile terminal. Therefore, the device 2100 may be a smart phone, a tablet PC, a smart watch, a PC, smart glasses, a smart TV, a PDA, a laptop computer, a media player, a micro server, a global positioning system (GPS) device, an e-book terminal, a digital broadcasting terminal, a navigation system, a kiosk, an MP3 player, a digital camera, or other mobile or non-mobile computing devices, but is not limited thereto.

The device 2100 may be a smart phone and may perform a communication using a cellular network or a communication using an Internet network. Examples of the communication may include a phone call, a short message service (SMS), Internet, and the like. By mounting various modules on the smart phone, the smart phone may perform the functions of a camera, a projector, a scanner, a printer, and the like.

In addition, the smart phone may perform various services by installing or using its own operating system (OS) or applications. Various types of services, including a financial service, a booking service, and a sensing service, may be performed by the smart phone's own functions or setting of related applications.

Embodiments may be embodied in a storage medium including computer-executable instruction codes, such as a computer-executable program module. A computer-readable medium may be any available medium which is accessible by the computer and may include any volatile/non-volatile media and any removable/non-removable media. Furthermore, the computer-readable medium may include any computer storage and communication media. The computer storage medium may include any volatile/non-volatile and removable/non-removable media embodied by a certain method or technology for storing information such as computer-readable instruction code, a data structure, a program module, or other data. The communication media may include computer-readable instruction code, a data structure, a program module, other data of modulated data signals, or other transmission mechanisms, and may include any information transmission media.

In addition, the term "unit" as used herein may mean a hardware component, such as a processor or a circuit, and/or a software component that is executed by a hardware component such as a processor.

It should be understood that embodiments described herein should be considered in a descriptive sense only and not for purposes of limitation. Descriptions of features or aspects within each embodiment should typically be considered as available for other similar features or aspects in other embodiments. For example, each element described as a singular form may be implemented in a distributed manner, and elements described as distributed may be implemented in an integrated manner.

While one or more embodiments have been described with reference to the figures, it will be understood by those of ordinary skill in the art that various changes in form and details may be made therein without departing from the spirit and scope as defined by the following claims.

What is claimed is:
1. A communication connection method comprising:
receiving, by a first image forming apparatus, a signal including a data packet from a second image forming apparatus:
the first image forming apparatus having a first connection reference strength level indicating a first connection boundary from the first image forming apparatus, the first image forming apparatus being configured to be connectable to devices located within the first connection boundary, and
the second image forming apparatus having a second connection boundary from the second image forming apparatus, the second image forming apparatus being configured to be connectable to devices located within the second connection boundary;
determining, by the first image forming apparatus, a signal strength of the received signal; and
changing, by the first image forming apparatus, the first connection reference strength level based on the determined signal strength, so that the first connection boundary of the first image forming apparatus does not overlap with the second connection boundary of the second image forming apparatus.

2. The communication connection method of claim 1, further comprising broadcasting, by the first image forming apparatus, a signal including a data packet from the first image forming apparatus to one or more devices among the devices located within the first connection boundary.

3. The communication connection method of claim 2, wherein the broadcasting of the signal from the first image forming apparatus further comprises increasing a packet transmission time interval when the first image forming apparatus does not receive a connection request for a first predetermined time.

4. The communication connection method of claim 3, further comprising scanning a device among the one or more devices so as to discover the device, when the first image forming apparatus does not receive the connection request for a second predetermined time.

5. The communication connection method of claim 3, further comprising changing the first image forming apparatus from an awake mode to a sleep mode when the first image forming apparatus does not receive the connection request for a second predetermined time.

6. The communication connection method of claim 5, further comprising, changing the first image forming apparatus from the sleep mode to the awake mode when the first image forming apparatus receives an input to change to the awake mode while the first image forming apparatus is in the sleep mode.

7. The communication connection method of claim 1, wherein a device among the devices located within the first connection boundary is set as a connection target device by the first image forming apparatus, when a signal strength of a connection request to be received from the device is greater than or equal to the first connection reference strength level.

8. The communication connection method of claim 1, wherein the first connection reference strength level of the first image forming apparatus after the changing is greater than the first connection reference strength level of the first image forming apparatus before the changing.

9. The communication connection method of claim 2, further comprising receiving a connection request from the one or more devices in response to the broadcasted signal by the first image forming apparatus.

10. The communication connection method of claim 9, further comprising performing a procedure of using a communication service with the one or more devices when the one or more devices are set as a one or more connection target devices.

11. A first image forming apparatus comprising:
a communicator configured to receive a signal including a data packet from a second image forming apparatus:
the first image forming apparatus having a first connection reference strength level indicating a first connection boundary from the first image forming apparatus, the first image forming apparatus being configured to be connectable to devices located within the first connection boundary, and
the second image forming apparatus having a second connection boundary from the second image forming apparatus, the second image forming apparatus being configured to be connectable to devices located within the second connection boundary; and
a controller configured to:
determine a signal strength of the received signal, and
change the first connection reference strength level based on the determined signal strength, so that the first connection boundary of the first image forming apparatus does not overlap with the second connection boundary of the second image forming apparatus.

12. The first image forming apparatus of claim 11, wherein the communicator is further configured to broadcast a signal including a data packet from the first image forming apparatus to one or more devices among the devices located within the first connection boundary.

13. The first image forming apparatus of claim 12, wherein the controller is further configured to increase a packet transmission time interval when the communicator does not receive a connection request for a first predetermined time.

14. The first image forming apparatus of claim 13, wherein the controller is set to scan a device among the one or more devices so as to discover the device, when the communicator does not receive the connection request for a second predetermined time.

15. The first image forming apparatus of claim 13, wherein the controller is further configured to change the communicator from an awake mode to a sleep mode when the communicator does not receive the connection request for a second predetermined time.

16. The first image forming apparatus of claim 15, wherein the controller is set to change the communicator from the sleep mode to an awake mode when the first image forming apparatus receives an input to change to the awake mode while the first image forming apparatus is in the sleep mode.

17. The first image forming apparatus of claim 11, wherein a device among the devices located within the first connection boundary is set as a connection target device by the first image forming apparatus, when a signal strength of a connection request to be received from the device is greater than or equal to the first connection reference strength level.

18. The first image forming apparatus of claim 17, wherein the first connection reference strength level of the first image forming apparatus after a change in the first connection reference strength is greater than the first connection reference strength level of the first image forming apparatus before the change in the first connection reference strength level.

19. The first image forming apparatus of claim 12, wherein the communicator is further configured to receive a connection request from the one or more devices in response to the broadcasted signal.

20. The first image forming apparatus of claim 19, wherein the controller is set to perform a procedure of using a communication service with the one or more devices when the one or more devices are set as a one or more connection target devices.

* * * * *